(12) United States Patent
Yang et al.

(10) Patent No.: US 11,409,434 B2
(45) Date of Patent: Aug. 9, 2022

(54) IMAGE COLLECTION AND PROCESSING METHOD, APPARATUS, AND STORAGE MEDIUM

(71) Applicant: Lenovo (Beijing) Co., Ltd., Beijing (CN)

(72) Inventors: Shuangxin Yang, Beijing (CN); Tingting Zhao, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 112 days.

(21) Appl. No.: 16/914,168

(22) Filed: Jun. 26, 2020

(65) Prior Publication Data
US 2020/0409549 A1 Dec. 31, 2020

(30) Foreign Application Priority Data

Jun. 30, 2019 (CN) .......................... 201910581768.5
Jun. 30, 2019 (CN) .......................... 201910581925.2

(51) Int. Cl.
| | | |
|---|---|---|
| G06F 3/048 | (2013.01) | |
| G06F 3/04886 | (2022.01) | |
| H04N 5/232 | (2006.01) | |
| H04N 5/225 | (2006.01) | |
| H04M 1/72427 | (2021.01) | |

(52) U.S. Cl.
CPC .... *G06F 3/04886* (2013.01); *H04M 1/72427* (2021.01); *H04N 5/2258* (2013.01); *H04N 5/23229* (2013.01)

(58) Field of Classification Search
CPC ............ H04N 5/23229; H04N 5/2258; H04M 1/72427; G06F 3/04886
See application file for complete search history.

(56) References Cited

U.S. PATENT DOCUMENTS

| | | | | |
|---|---|---|---|---|
| 5,499,074 A | * | 3/1996 | Ohsawa ................. | G02B 7/346 396/111 |
| 10,764,511 B1 | * | 9/2020 | Peterson ............... | H04N 5/2628 |
| 2010/0149377 A1 | * | 6/2010 | Shintani ............. | H04N 5/23245 348/231.5 |
| 2014/0098197 A1 | * | 4/2014 | Geris ................... | H04N 13/243 348/48 |
| 2014/0240543 A1 | | 8/2014 | Kim et al. | |
| 2015/0207970 A1 | * | 7/2015 | Min .................... | H04N 5/23218 348/14.07 |
| 2018/0260602 A1 | * | 9/2018 | He ..................... | A61B 5/14542 |

FOREIGN PATENT DOCUMENTS

| | | |
|---|---|---|
| CN | 101237556 A | 8/2008 |
| CN | 102780842 A | 11/2012 |
| CN | 103926785 A | 7/2014 |
| CN | 105338238 A | 2/2016 |
| CN | 105872365 A | 8/2016 |

(Continued)

*Primary Examiner* — Rashawn N Tillery
(74) *Attorney, Agent, or Firm* — Anova Law Group, PLLC

(57) ABSTRACT

A method includes, in response to a trigger instruction, obtaining first images from a first camera and displaying the first images on a first display area, and obtaining second images from a second camera and displaying the second images on a second display area. The first camera and the second camera are located at different positions. The first display area is different from the second display area.

18 Claims, 17 Drawing Sheets

(56) References Cited

FOREIGN PATENT DOCUMENTS

| | | | |
|---|---|---|---|
| CN | 106101553 | A | 11/2016 |
| CN | 106506924 | A | 3/2017 |
| CN | 106713716 | A | 5/2017 |
| CN | 107222671 | A | 9/2017 |
| CN | 107317993 | A | 11/2017 |
| CN | 107454269 | A | 12/2017 |
| CN | 107682622 | A | 2/2018 |
| CN | 108289167 | A | 7/2018 |
| CN | 108419016 | A | 8/2018 |
| CN | 108737739 | A | 11/2018 |
| CN | 107317993 | B * | 8/2019 |

* cited by examiner

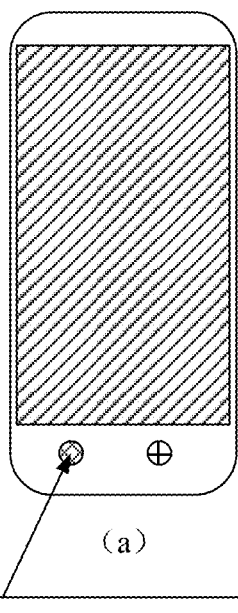
(a)
Camera A vertical recording
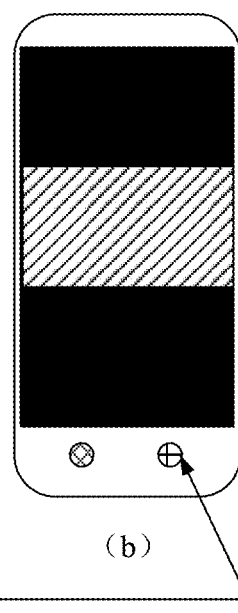
(b)
Camera B vertical recording
FIG. 18A  FIG. 18B
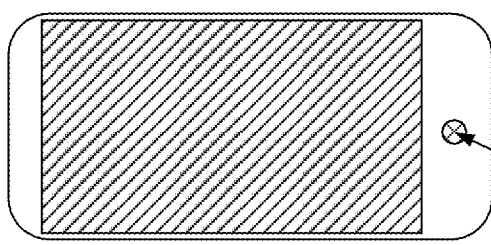
Camera A horizontal recording
FIG. 19

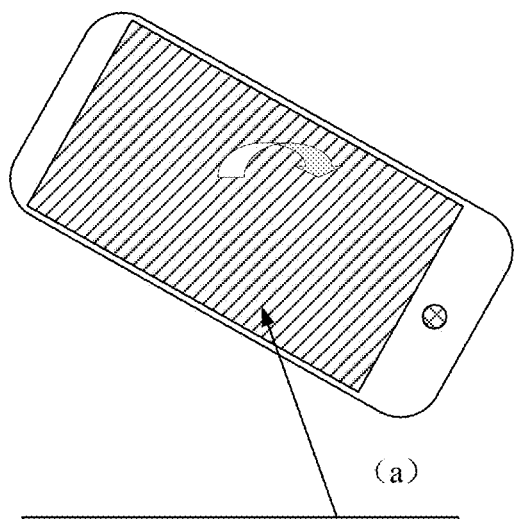 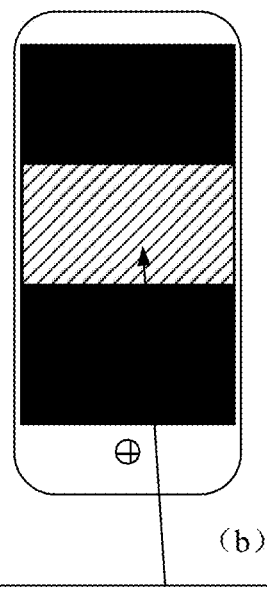
(a)
During horizontal recording of Camera A, rotating the cell phone to the vertical attitude
FIG. 20A
(b)
Camera B takes over the recording, and Camera B stops the recording.
FIG. 20B

IMAGE COLLECTION AND PROCESSING METHOD, APPARATUS, AND STORAGE MEDIUM

CROSS-REFERENCES TO RELATED APPLICATIONS

This application claims priority to Chinese Patent Application No. 201910581925.2, filed on Jun. 30, 2019, and Chinese Patent Application No. 201910581768.5, filed on Jun. 30, 2019, the entire contents of both of which are incorporated herein by reference.

TECHNICAL FIELD

The present disclosure generally relates to the computer technology field and, more particularly, to an image collection and processing method, apparatus, and storage medium.

BACKGROUND

In the related technology, when a user uses a cell phone to record a scene, the cell phone may capture different information by recording in a horizontally-oriented manner and a vertically-oriented manner, since horizontal recording and vertical recording cover different ranges. These two recording methods may not be used at the same time.

An image captured under a portrait mode (i.e., when the phone is held vertically) may only be a vertically-oriented image or portrait-mode image (hereinafter referred as a vertical image), and an image captured when the phone is held horizontally may only be a horizontally-oriented image or landscape-mode image (hereinafter referred as a horizontal image). When the image captured under the portrait mode is displayed on a phone held horizontally, the image may not be displayed in full screen, which affects a viewing effect.

SUMMARY

Embodiments of the present disclosure provide a method. The method includes, in response to a trigger instruction, obtaining first images from a first camera and outputting the first images on a first display area, and obtaining second images from a second camera and outputting the second images on a second display area. The first camera and the second camera are located at different positions. The first display area is different from the second display area.

Embodiments of the present disclosure provide a device including a first camera, a second camera, a processor, and a memory. The memory stores instructions that, when executed by the processor, cause the processor to, in response to a trigger instruction, obtain first images from a first camera and display the first images on a first display area, and obtain second images from a second camera and display the second images on a second display area. The first camera and the second camera are located at different positions. The first display area is different from the second display area.

Embodiments of the present disclosure provide a non-transitory storage medium storing computer programs that, when executed by a processor, cause the processor to, in response to a trigger instruction, obtain first images from a first camera and display the first images on a first display area, and obtain second images from a second camera and display the second images on a second display area. The first camera and the second camera are located at different positions. The first display area is different from the second display area.

BRIEF DESCRIPTION OF THE DRAWINGS

FIGS. 18A and 18B illustrate schematic diagrams of the image processing apparatus performing horizontal recording and vertical recording when being held vertically according to some embodiments of the present disclosure.

FIG. 19 illustrates a schematic diagram of the image processing apparatus performing horizontal recording when being held horizontally according to some embodiments of the present disclosure.

FIGS. 20A and 20B illustrate schematic diagrams of the image processing apparatus performing the horizontal recording when rotating from a vertical attitude to a horizontal attitude according to some embodiments of the present disclosure.

DETAILED DESCRIPTION OF THE EMBODIMENTS

To make objectives, technical solutions, and advantages of the present disclosure clearer, specific technical solutions of the present disclosure are described further in detail in connection with drawings. Following embodiments are used to describe the present disclosure but do not limit the scope of the present disclosure.

When detailing embodiments of the present disclosure, to facilitate explanation, the cross-sectional view showing a structure of a device may be partially enlarged without according to a certain scale. The schematic diagram is only an example, which should not limit the scope of the present disclosure. In addition, the actual production should include three-dimensional dimensions of length, width, and depth.

An image processing method provided by embodiments of the present disclosure may be applied to an image processing device. The image processing device may be applied to an image processing apparatus. The image processing apparatus is configured to, in response to a trigger instruction, obtain first captured images through a first camera in real-time and output the first captured images through a first display area in real-time, and obtain a second captured images through a second camera in real-time and output the second captured images through a second display area in real-time. The first camera and the second camera are fixed at different positions. The first display area is different from the second display area.

Embodiments of the present disclosure provide an image processing method. The method is applied to the image processing apparatus that processes an image. Hardware resources of a processing apparatus (e.g., terminal apparatus, server) may cooperate to realize each of functional modules of the image processing apparatus. The hardware resources may include computing resources such as processors, detection resources such as sensors, and communication resources.

The image processing apparatus may include any image processing apparatus having an information processing capability. In some embodiments, the image processing apparatus may include a smart terminal, for example, a mobile terminal or AR/VR apparatus with a wireless communication capability such as a notebook computer, a smartphone, a tablet computer, etc. In some other embodiments, the image processing apparatus may further include a terminal apparatus having a computing function that is not convenient to move. The image processing apparatus may include a desktop computer, etc., as long as the image processing apparatus includes two or more image collection devices.

Embodiments of the present disclosure are not limited to be implemented by methods and hardware. Other implementation methods may exist, such as using a storage medium (storing instructions used to execute the image processing method provided by embodiments of the present disclosure).

Figure 1:
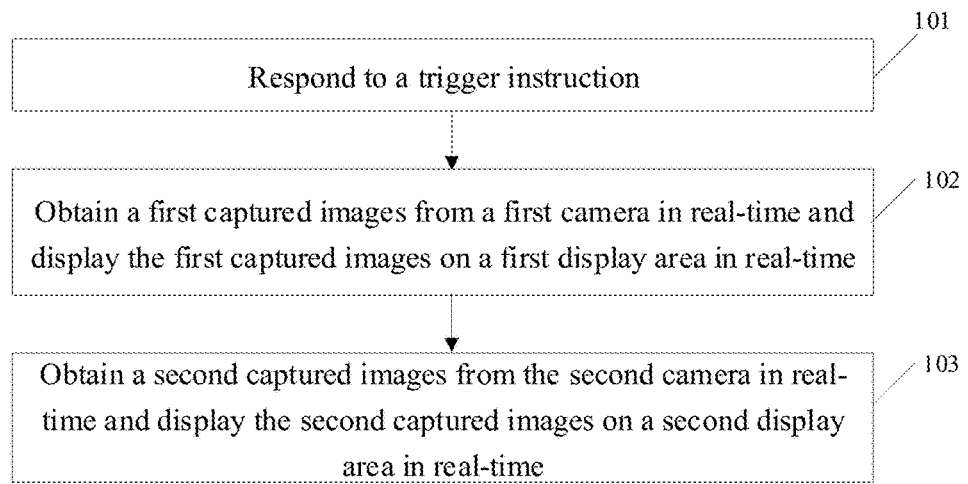
FIG. 1 illustrates a schematic flowchart of an image processing method according to some embodiments of the present disclosure.

FIG. 1 illustrates a schematic flowchart of an image processing method according to some embodiments of the present disclosure.

At 101, the method includes responding to a trigger instruction.

The image processing method of embodiments of the present disclosure is applied to the image processing apparatus. When the image processing apparatus receives the trigger instruction, the image process apparatus responds to the trigger instruction by initiating a multi-camera mode. The trigger instruction may be used to trigger the image processing apparatus to switch camera modes.

The trigger instruction may be generated based on an operation performed by a user on the image processing apparatus. The trigger instruction is used to instruct a terminal apparatus to enter a preview interface.

For example, the image processing apparatus receives an operation on a specified icon on the desktop of the image processing apparatus to generate a trigger instruction to enter the preview interface. For another example, the image processing apparatus receives a determined slide operation to generate the trigger instruction to enter the preview interface.

For another example, a display screen of the image processing apparatus displays a selection dialog box. The selection dialog box includes two options: a single-camera mode and a multi-camera mode. After the image processing apparatus receives a selection operation from the user selecting the multi-camera mode in the selection dialog box, the image processing apparatus generates the trigger instruction based on the selection operation.

At 102, the method includes obtaining first captured images from a first camera in real-time and displaying the first captured images on a first display area in real-time.

The first display area is located at the display screen of the image processing apparatus. The first display area may include a preview frame at the display screen of the image processing apparatus.

The image processing apparatus at least includes two cameras, i.e., a first camera and a second camera. When the image processing apparatus switches to the multi-camera mode, the image processing apparatus captures scenes in a preview range of the first camera in real-time through the first camera to obtain the first captured images, and outputs the first captured images through the first display area in real-time.

For example, the image processing apparatus includes a first camera and a second camera. when the image processing apparatus switches to the multi-camera mode, the image processing apparatus captures the scenes in a preview range of the first camera through the first camera in real-time to obtain first captured images, and outputs the first captured images through the first display area in real-time.

At 103, the method includes obtaining second captured images from the second camera in real-time and displaying the second captured images on a second display area in real-time.

The second display area is arranged at the display screen of the image processing apparatus. The second display area may include a preview frame of the display screen of the image processing apparatus.

The image processing apparatus at least includes two cameras of the first camera and the second camera. When the image processing apparatus switches to the multi-camera mode, the image processing apparatus captures scenes in a preview range of the second camera in real-time through the second camera to obtain the second captured images, and outputs the second captured images through the second display area in real-time.

For example, the image processing apparatus includes the first camera and the second camera. when the image processing apparatus switches to the multi-camera mode, the image processing apparatus captures the scenes in a preview range of the second camera through the second camera in real-time to obtain second captured images, and outputs the second captured images through the second display area in real-time.

The first camera and the second camera are located at different positions. The first display area is different from the second display area.

The first camera and the second camera are located at the different positions of the image processing apparatus. For example, the image processing apparatus may include a cell phone. In one example, the first camera is located at the front of the cell phone, and the second camera is located on the back of the cell phone. In another example, the first camera and the second camera are located at different positions on the back of the cell phone.

The first display area is different from the second display area. The first display area and the second display area may include different display areas at a same display screen or different display areas at different display screens. Sizes of the first display area and the second display area may be the same or different.

Figure 2:
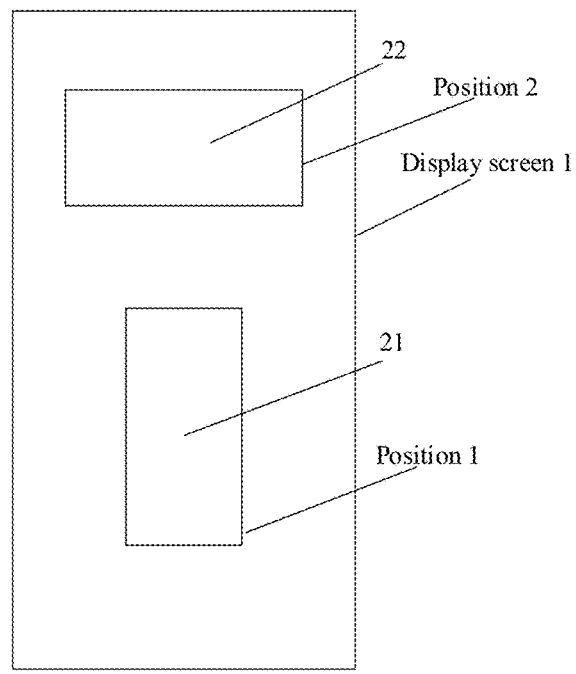
FIG. 2 illustrates a schematic diagram of display area positions according to some embodiments of the present disclosure.
Figure 3:
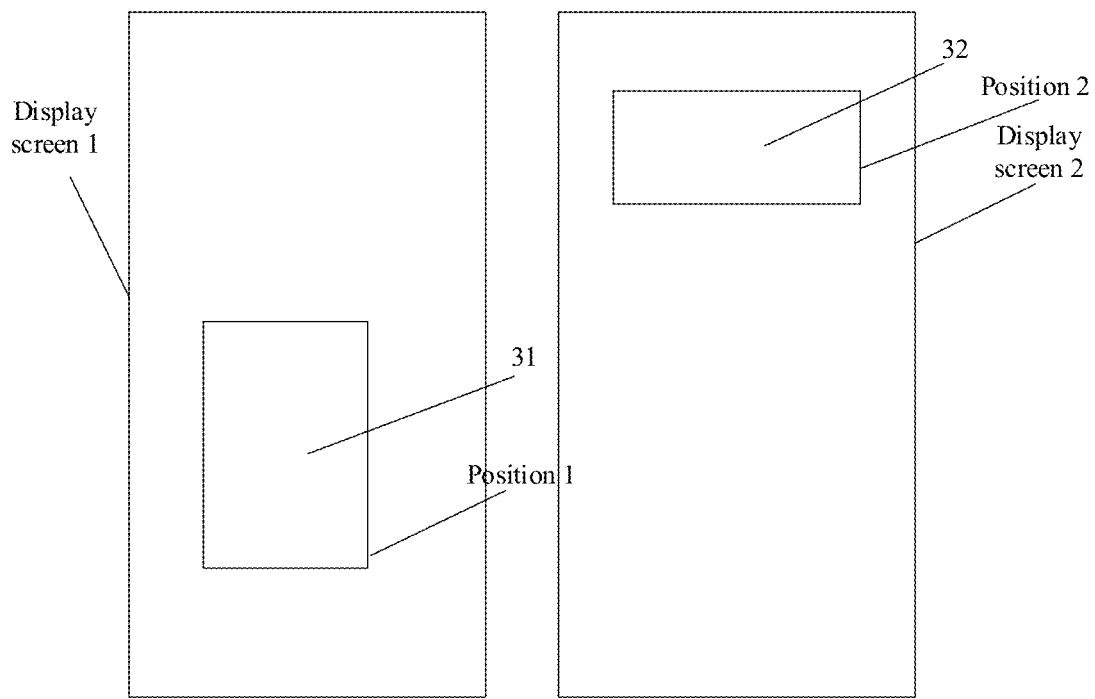
FIG. 3 illustrates another schematic diagram of positions of display areas according to some embodiments of the present disclosure.

For example, as shown in FIG. 2, a first display area 21 is arranged at position 1 of the display screen. A second display area 22 is arranged at position 2 of the same display screen. The sizes of the first display area and the second display area are the same. For another example, as shown in FIG. 3, the image processing apparatus includes display screen 1 and display screen 2. A first display area 31 is arranged at position 1 of display screen 1. A second display area 32 is arranged at position 2 of display screen 2. The sizes of the first display area and the second display area are different.

The image processing method provided by embodiments of the present disclosure includes responding to the trigger instruction. The method includes obtaining the first captured images from the first camera in real-time and outputting the first captured images on the first display area in real-time. The method further includes obtaining the second captured images from the second camera in real-time and outputting the second captured images on the second display area in real-time. The first camera and the second camera are fixed at different positions. The first display area is different from the second display area. As such, the method includes using the same image processing apparatus to obtain video files recorded in the horizontally-oriented manner and vertically-oriented manner at the same time, which improves user experience.

In some embodiments, a long side of a photosensitive array of the first camera is perpendicular to a long side of a photosensitive array of the second camera. The first camera and the second camera have isomorphic camera components.

The photosensitive array of the first camera includes the long side and a short side. The photosensitive array of the second camera also includes the long side and the short side. The long side of the photosensitive array of the first camera is perpendicular to the long side of the photosensitive array of the second camera.

Figure 4:
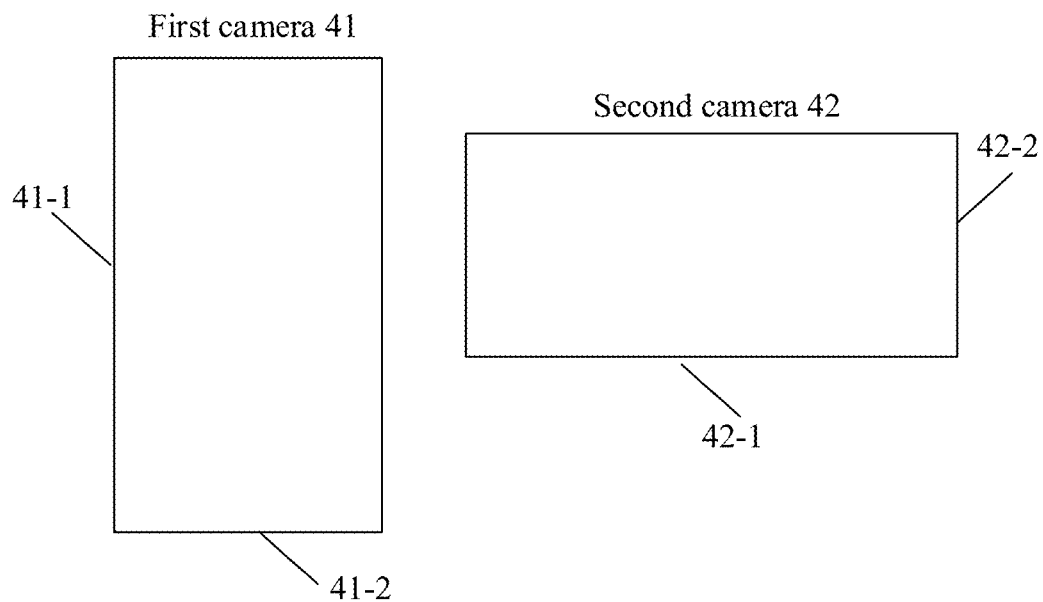
FIG. 4 illustrates a schematic diagram of a camera layout according to some embodiments of the present disclosure.

For example, as shown in FIG. 4, sides of the photosensitive array of a first camera 41 includes a long side 41-1 and a short side 41-2. Sides of the photosensitive array of the second camera includes a long side 42-1 and a short side 42-2. The long side 41-1 of the first camera 41 is perpendicular to the long side 42-1 of the second camera 42.

The first camera and the second camera may include the isomorphic camera components having same optical parameters of resolution, aperture, focal length, etc., and same assemblies of lenses, focus motors, etc.

The first camera and the second camera may also include heterogeneous camera components with one or more different elements of optical parameters of resolution, aperture, focal length, etc., and same assemblies of lenses, focus motors, etc.

The long side of the first display area corresponding to the first camera is perpendicular to the long side of the second display area corresponding to the second camera.

In some embodiments, the first display area and the second display area are different display areas at the same display screen.

The first display area and the second display area are located at the same display screen of the image processing apparatus. The positions of the first display area, the second display area, and the long side of the image processing apparatus may change when the image processing apparatus is held differently.

For example, the long side of the photosensitive array of the first camera is parallel to the long side of the image processing device. the long side of the photosensitive array of the second camera is perpendicular to the long side of the image processing device. The relationship between the first display area and the second display area and the holding status on the same display screen is described.

If the image processing apparatus is held vertically (i.e., the attitude of the image processing apparatus is vertical), the long side of the first display area corresponding to the first camera may be parallel to the long side of the image processing apparatus, and the long side of the second camera corresponding to the second display area may be perpendicular to the long side of the image processing apparatus. As such, the long side of the first display area is perpendicular to the long side of the second display area.

Figure 5:
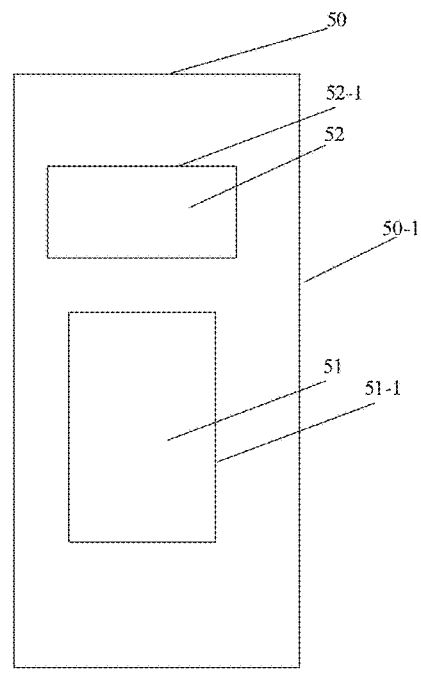
FIG. 5 illustrates a schematic diagram showing a display area of an image processing apparatus being held vertically according to some embodiments of the present disclosure.

As shown in FIG. 5, a long side 51-1 of a first display area 51 corresponding to the first camera is parallel to a long side 50-1 of an image processing apparatus 50. A long side 52-1 of a second display area 52 corresponding to the second camera is perpendicular to the long side 50-1 of the image processing apparatus 50. The long side 51-1 of the first display area 51 is perpendicular to the long side 52-1 of the second display area 52.

If the image processing apparatus is held horizontally, the long side of the first display area corresponding to the first camera is parallel to the long side of the image processing apparatus, and the long side of the second display area corresponding to the second camera is perpendicular to the long side of the image processing apparatus. As such, the long side of the first display area is perpendicular to the long side of the second display area.

Figure 6:
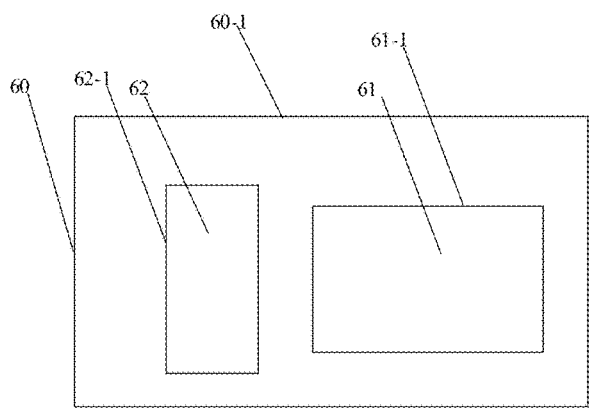
FIG. 6 illustrates a schematic diagram showing the display area of the image processing apparatus being held horizontally according to some embodiments of the present disclosure.

As shown in FIG. 6, a long side 61-1 of a first display area 61 corresponding to the first camera is parallel to a long side 60-1 of an image processing apparatus 60. A long side 62-1 of a second display area 62 corresponding to the second camera is perpendicular to the long side 60-1 of the image processing apparatus 60. The long side 61-1 of the first display area 61 is perpendicular to the long side 62-1 of the second display area 62.

For example, the long side of the photosensitive array of the first camera is parallel to the long side of the image processing device. The long side of the photosensitive array of the second camera is perpendicular to the long side of the image processing device. The relationship between the first display area and the second display area in the different display screens are described below.

If the image processing apparatus is held vertically, the long side of the first display area corresponding to the first camera is parallel to the long side of the image processing apparatus, and the long side of the second display area corresponding to the second camera is perpendicular to the long side of the image processing apparatus. As such, the long side of the first display area is perpendicular to the long side of the second display area.

Figure 7:
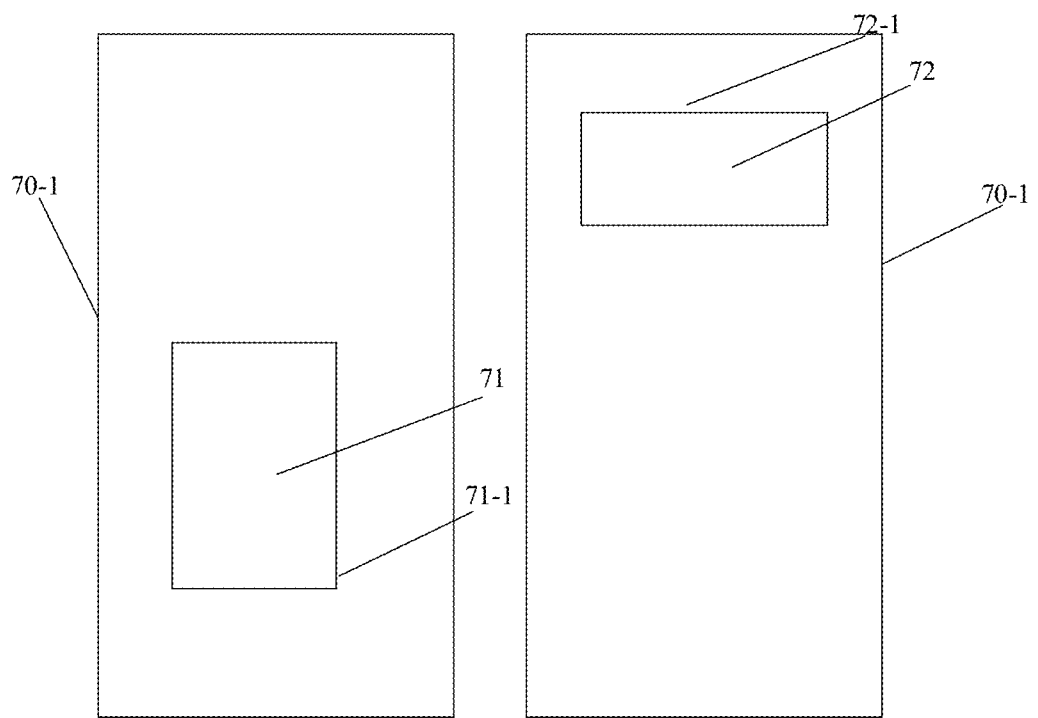
FIG. 7 illustrates a schematic diagram of the display areas when the display areas are on different display screens according to some embodiments of the present disclosure.

As shown in FIG. 7, a long side 71-1 of a first display area 71 corresponding to the first camera is parallel to a long side 70-1 of an image processing apparatus 70. A long side 72-1 of a second display area 72 corresponding to the second camera is perpendicular to the long side 70-1 of the image processing device 70. The long side 71-1 of the first display area 71 is perpendicular to the long side 72-1 of the second display area 72.

In some embodiments, the display screen displays operating control elements. The operating control elements are at least configured to receive a first operation of the user to generate a record-start instruction to start saving the images captured by the first camera and the second camera in real-time and sound collected by a microphone in real-time. The operating control elements are further configured to receive a second operation of the user to generate a record-end instruction to end saving the images captured by the first camera and the second camera in real-time and the sound collected by the microphone in real-time.

The display screen of the image processing apparatus displays the operating control elements. The operating control elements may include virtual operating control elements, or hardware operating control elements. The operating control elements are configured to control the start and end of the recording in the multi-camera mode.

Figure 8:
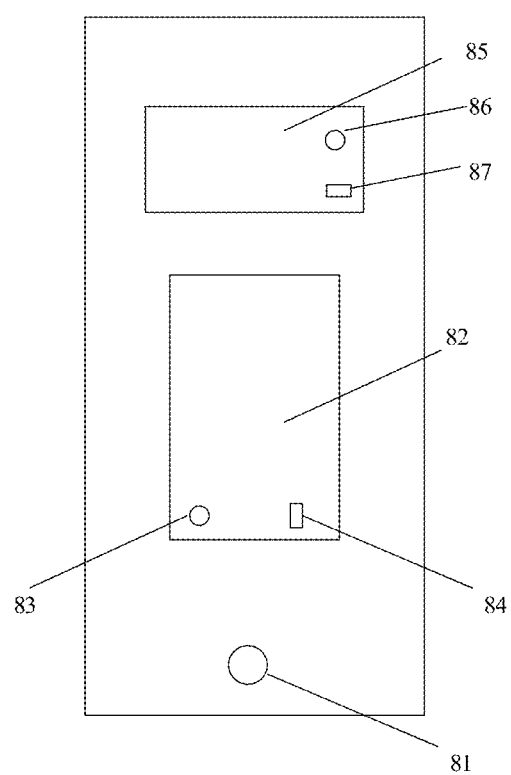
FIG. 8 illustrates a schematic diagram of the display screen after recording starts when the image processing apparatus is held vertically according to some embodiments of the present disclosure.

As shown in FIG. 8, the display screen of the image processing apparatus displays an operating control element 81. The operating control element 81 is at least configured to receive the first operation of the user to generate the record-start instruction to start saving the images captured by the first camera and the second camera in real-time and the sound collected by the microphone in real-time. The operating control element is further configured to receive the second operation of the user to generate the record-end instruction to end saving the images captured by the first camera and the second camera in real-time and the sound collected by the microphone in real-time.

The first operation and the second operation may include interactive methods such as single-clicking, double-clicking, or long-pressing based on the operation control element. Embodiments of the present disclosure do not limit the interaction methods between the first operation and the second operation.

In some embodiments, the image processing apparatus starts saving the images captured by the first camera and the second camera in real-time and the sound collected by the microphone in real-time based on the recording-start instruction. During this process, first display area displays the first images captured by the first camera in real-time. The second display area displays the second images captured by the second camera in real-time. The first display area includes a first sub-operating control element. The first sub-operating control element is configured to control the first camera. The second display area includes a second sub-operating control element. The second sub-operating control element is configured to control the second camera.

The image processing apparatus starts saving the captured image captured by the first camera and the second camera in real-time and the sound collected by the microphone in real-time based on the recording-start instruction. During this process, the first display area corresponding to the first camera displays the first images captured by the first camera. The second display area corresponding to the second camera displays the second images captured by the second camera.

As shown in FIG. 5, the image processing apparatus is held vertically. The first display area 51 corresponding to the first camera displays the first images captured by the first camera simultaneously. The second display area 52 corresponding to the second camera displays the second images captured by the second camera simultaneously.

As shown in FIG. 6, the image processing apparatus is held horizontally. The first display area 61 corresponding to the first camera displays the first images captured by the first camera simultaneously. The second display area 62 corresponding to the second camera displays the second images captured by the second camera simultaneously.

The first display area includes the first sub-operating control element. The first sub-operating control element is configured to control the first camera. The second display area includes the second sub-operating control element. The second sub-operating control element is configured to control the second camera.

The first sub-operating control element of the first display area may include one or a plurality of control elements. The first sub-operating element is configured to control the first camera. Embodiments of the present disclosure do not limit the quantity and function of the first sub-operating control element.

In some embodiments, the first sub-operating control element of the first display area may include the control elements for controlling the first camera, such as a record-pause button, a photographing button, etc. For example, in FIG. 8, the first sub-operating control element of a first display area 82 includes a record-pause button 83 and a photographing button 84.

If the first sub-operating control element includes the record-pause button, when receiving an operation of the user based on the record-pause button, the image processing apparatus controls the first camera to stop/start capturing the images and displaying the captured images. If the first sub-operating control element includes the photographing button, when receiving an operation of the user based on the photographing button, the image processing apparatus controls the first camera to extract the frame image corresponding to the first display area based on the time when the photographing button receives the operation, and saves the frame image as an independent image. The recording process of the first camera is not impacted by whether the photographing button of the first sub-operating control element receives the operation.

The second display area includes a second sub-operating control element. The second sub-operating control element may include one or more control elements. The second sub-operating control element is configured to control the second camera. Embodiments of the present disclosure do not limit the number and functions of the second sub-operating control element.

In some embodiments, the second sub-operating control element in the second display area may include the control elements for controlling the second camera, such as the record-pause button, the photographing button, etc. As shown in FIG. 8, the second sub-operating control element in a second display area 85 includes a record-pause button 86 and a photographing button 87.

If the second sub-operating control element includes the record-pause button, when receiving the operation of the user based on the record-pause button, the image processing apparatus controls the second camera to stop capturing images and displaying the captured images. If the second sub-operating control element includes the photographing button, when receiving an operation of the user based on the photographing button, the image processing apparatus controls the second camera to extract the frame image corresponding to the second display area based on the time when the photographing button receives the operation, and saves the frame image as an independent image. The recording process of the second camera is not impacted by whether the photographing button of the second sub-operating control element receives the operation.

As shown in FIG. 8, the first sub-operating control element and the second sub-operating control element are the same. In practical applications, the control elements included in the second sub-operating control element and the control elements included in the first sub-operating control element may be the same or different.

The first sub-operating control element may only apply to the first display area. The second sub-operating control element may only apply to the second display area. A sub-operating control element corresponding to each display area is only configured to control a corresponding camera, the other camera and the other sub-operating control element are not impacted.

Figure 9:
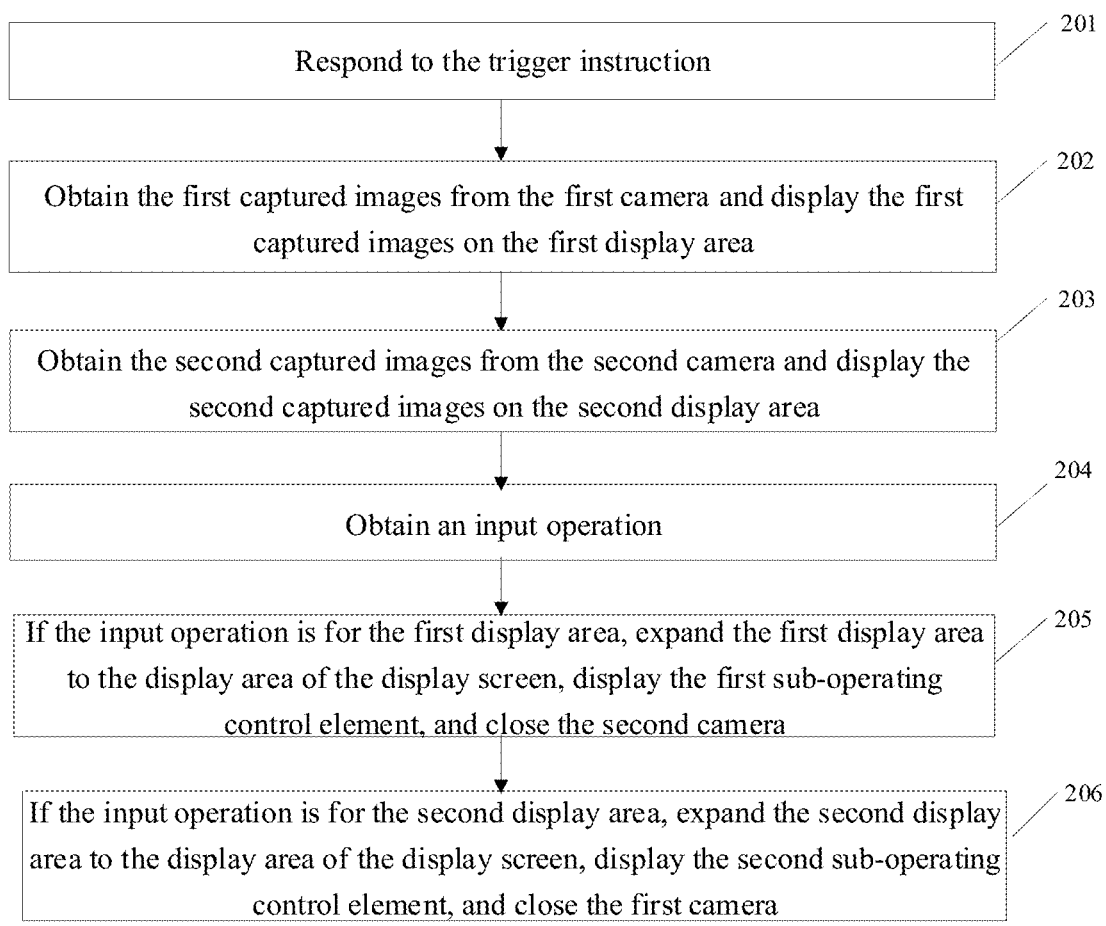
FIG. 9 illustrates a schematic flowchart of another image processing method according to some embodiments of the present disclosure.

Embodiments of the present disclosure provide an image processing method as shown in FIG. 9.

At 201, the method includes responding to the trigger instruction.

At 202, the method includes obtaining the first captured images from the first camera and displaying the first captured images on the first display area.

At 203, the method includes obtaining the second captured images from the second camera and displaying the second captured images on the second display area.

For the processes 201 to 203, reference is made to the processes 101 to 103 of above-described embodiments.

At 204, the method includes obtaining an input operation.

When displaying the first captured images on the first display area in real-time and displaying the second captured images on the second display area in real-time, the image processing apparatus obtains the input operation of the user.

The input operation may include input operations such as voice input, touch input, etc.

At 205, if the input operation is for the first display area, the method includes expanding the first display area to the display area of the display screen (e.g., full screen), displaying the first sub-operating control element, and closing the second camera.

When receiving the input operation for the first display area, the image processing device expands the first display area to the display area of the display screen, displaying the first sub-operating control element in the display area of the whole display screen, and closing the second camera. The image processing apparatus does not use the second camera further to capture the images.

In some embodiments, as shown in 10A, the same display screen of the image processing device includes a first display area 1001 and a second display area 1002. The user performs the input operation on the first display area 1001.

Figure 10A:
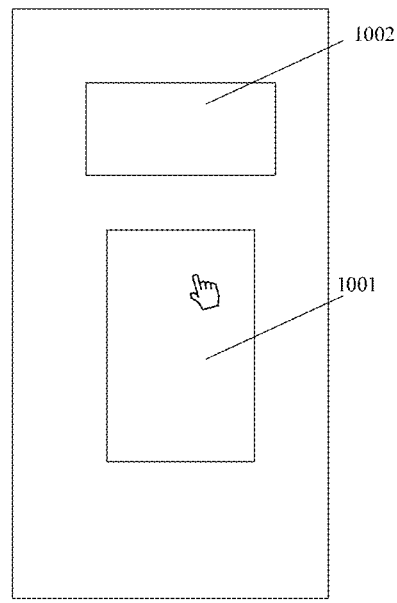
FIG. 10A illustrates a schematic diagram of input on a first display area according to some embodiments of the present disclosure.
Figure 10B:
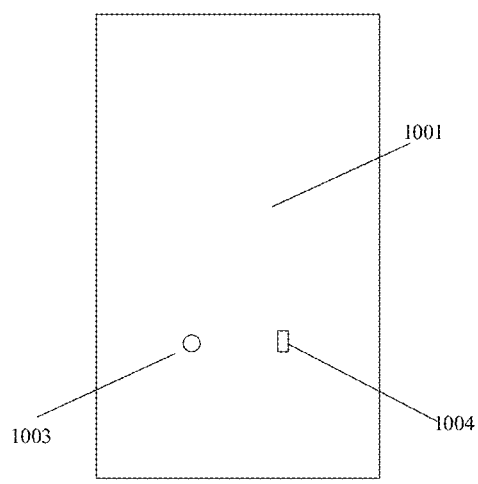
FIG. 10B illustrates a schematic diagram of the first display area being enlarged to the display screen according to some embodiments of the present disclosure.

As shown in FIG. 10B, after receiving the input operation, the image processing device controls the first display area 1001 to expand to the display area of the display screen, display the first sub-operating control element, i.e., a record-pause button 1003 and a photographing button 1004, and close the second camera corresponding to the second display area 82.

At 206, if the input operation is for the second display area, the method includes expanding the second display area to the display area of the display screen, displaying the second sub-operating control element, and closing the first camera.

When receiving the input operation for the second display area, the image processing apparatus expands the second display area to the display area of the display screen, displaying the second sub-operating control element in the display area of the whole display screen, and closing the first camera. The image processing apparatus does not use the first camera further to capture the images.

The image processing method provided by embodiments of the present disclosure may include, based on the input operation, expanding the first display area to the display area of the display screen, displaying the first sub-operating control element, and closing the second camera. Alternatively, the method may include expanding the second display area to the display area of the display screen, displaying the second sub-operating control element, and closing the first camera. As such, the image processing device may output the corresponding captured image according to the user's needs to improve the user experience.

Figure 11:
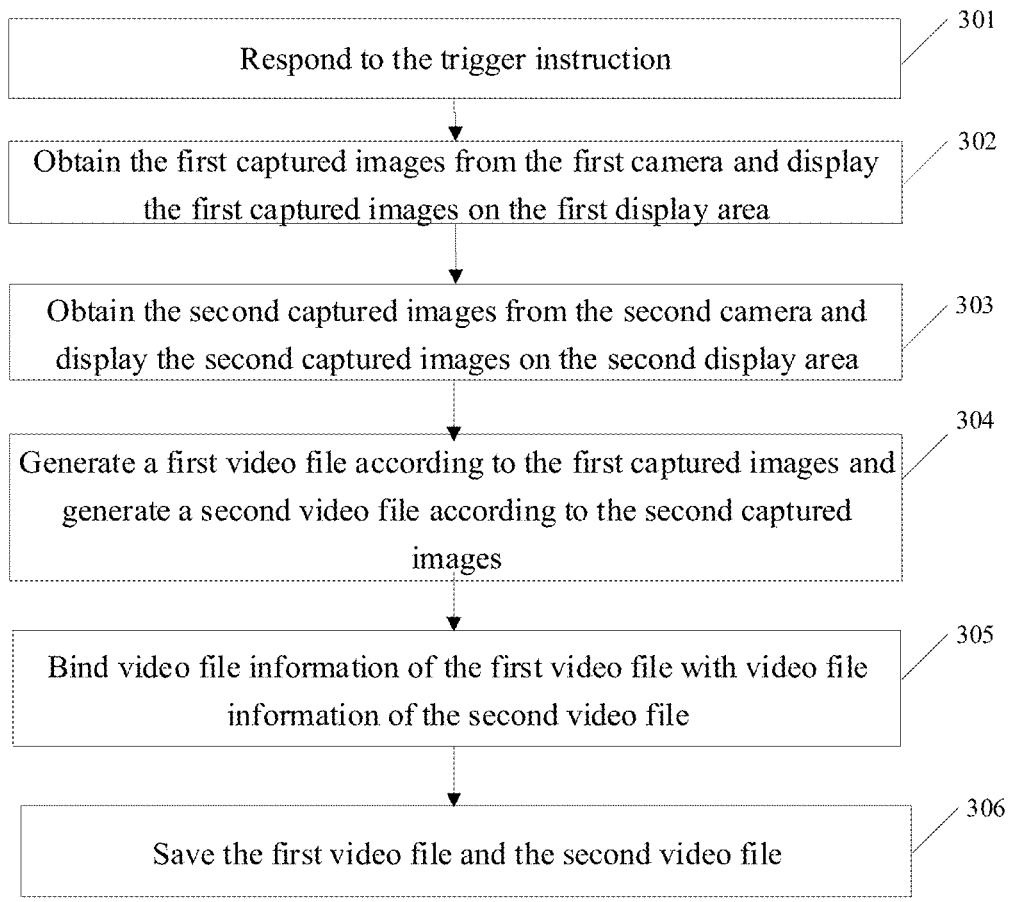
FIG. 11 illustrates a schematic flowchart of another image processing method according to some embodiments of the present disclosure.

Embodiments of the present disclosure provide an image processing method as shown in FIG. 11.

At 301, the method includes responding to the trigger instruction.

At 302, the method includes obtaining the first captured images from the first camera and displaying the first captured images on the first display area.

At 303, the method includes obtaining the second captured images from the second camera and displaying the second captured images on the second display area.

For the processes 301 to 303, reference is made to the processes 101 to 103 of above-described embodiments.

At 304, the method includes generating a first video file according to the first captured images and generating a second video file according to the second captured images.

When displaying the first captured images on the first display area in real-time, and displaying the second captured images on the second display area, the image processing apparatus generates the first video file according to the first captured images and generates the second video file according to the second captured images.

If the image processing apparatus is held vertically, the first video file generated from the first captured images is a vertically recorded video file (i.e., portrait-mode video file), and the second video file generated from the second captured images is a horizontally recorded video file (i.e., landscape-mode video file). If the image processing apparatus is held horizontally, the first video file generated from the first captured images is a horizontally recorded video file, and the second video file generated from the second captured images is a vertically recorded video file.

At 305, the method includes binding video file information of the first video file with video file information of the second video file.

The first captured images and the second captured images are based on the same trigger instruction. The images of the scene in a same area are captured by different cameras. The first captured images are captured by the first camera and are displayed on the first display area. The second captured images are captured by the second camera and are displayed on the second display area.

When the image processing apparatus is held vertically, the first display area is the preview window for the vertical recording. The second display is the preview window for the horizontal recording. The first video file generated according to the first captured images is the vertically recorded video file. The second video file generated according to the second captured images is the horizontally recorded video file. Therefore, the first video file and the second video file are recorded in different ways and have a certain association relationship.

The video file information of the first video file and the video file information of the second video file have the association relationship and are bundled together. The video file information may include recording time, recording format, etc.

When the image processing apparatus is held horizontally, the method for generating the video files is similar as the above-described method, which is not repeated here.

At 306, the method includes saving the first video file and the second video file.

The first video file and the second video file are saved separately as two individual files.

When the first video file and the second video file are saved as the two individual files, the video file information of the second video file may be found according to the video file information of the first video file to obtain the second video file. Alternatively, the video file information of the first video file may be found according to the video file information of the second video file to obtain the first video file.

After saving the first video file and the second video file, the image processing apparatus may play the first video file and the second video file separately, or may play the first video file and the second video file together.

In some embodiments, by saving the first video file and the second video file separately, the image processing apparatus may automatically select different video files from the first video file and the second video file according to different scenes.

The image processing apparatus automatically selects the different video files from the first video file and the second video file according to the different scenes.

The different scenes include projection scenes, playback scenes, sharing scenes, etc. Embodiments of the present disclosure do not limit the scenes.

The projection scenes, the broadcast scenes, and the share scenes are taken as examples to describe the selection of the video file.

In the projection scenes, the image processing apparatus selects the video file from the first video files and the second video file according to screen/picture layout of a projection target apparatus. For example, the first video file includes the vertically recorded video file, and the second video file includes the horizontally recorded video file. If the projection target apparatus includes a horizontal screen TV, the image processing apparatus selects the second video file to play.

In the broadcast scenes of using the local player of the image processing apparatus to play the video file, the image processing apparatus selects the video file from the first video files and the second video file according to how the image processing apparatus is held. For example, the first video file includes the vertically recorded video file, and the second video file includes the horizontally recorded video file. If the image processing apparatus is held vertically, the image processing apparatus selects the first video file. If the image processing apparatus is held horizontally, the image processing apparatus selects the second video file.

In the share scenes, the image processing apparatus may select the video file from the first video files and the second video file according to a display area of shared social software. For example, the first video file includes the vertically recorded video file, and the second video file includes the horizontally recorded video file. If the display area of the social software corresponds to a vertical screen, the image processing apparatus selects the first video file to share the recorded video file in the social software.

Figure 12:
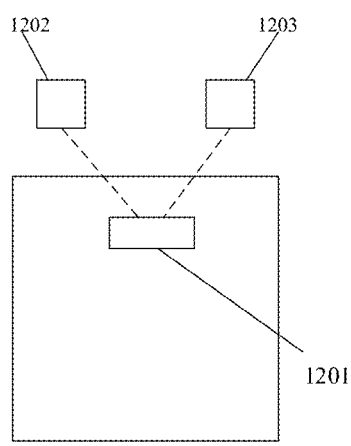
FIG. 12 illustrates a schematic diagram of a same prompt icon corresponding to a first video file and a second video file according to some embodiments of the present disclosure.

In some embodiments, when the user previews the first video file and the second video file, the image processing apparatus may output a prompt icon of a video on the display screen, and the prompt icon may include a thumbnail or video icon. As shown in FIG. 12, a prompt icon 1201 corresponds to a first video file 1202 and a second video file 1203.

Based on the operation of the user on the prompt icon, the image processing apparatus selects the video file from the first video file and the second video file.

The image processing method provided by embodiments of the present disclosure includes bundling the video file information of the first video file and the video file information of the second video file, and automatically selecting different video files from the first video file and the second video file according to the different scenes. For example, the method may include, through video file information of any one of the video files, finding another video file conveniently and quickly, and automatically selecting a required video file according to the different scenes to improve the user experience.

The image processing method provided by embodiments of the present disclosure is described through specific scenes.

In some embodiments, two isomorphic cameras or heterogeneous cameras are arranged with their long sides being perpendicular to each other, e.g., the first camera is disposed by rotating 90° counterclockwise relative to the second camera.

With the above-described hardware layout, no matter the cell phone is held horizontally or vertically, the recording may be started simultaneously by using the two cameras to generate two video files. That is, one video file is recorded horizontally, and the other video file is recorded vertically, and the user may select the corresponding video according to broadcast needs.

As shown in FIG. 8, the cell phone starts two-way recording in the vertical-oriented direction, and the bottom main button 81 is configured to control the two-way recording to start and stop. The two recordings have individual preview windows, respectively, to facilitate the user to find a desired view before the recording and during the recording. The preview window 82 is the preview window for the vertical recording, and the preview window 85 is the preview window for the horizontal recording. The two recordings have individual control buttons, respectively, i.e., record-pause buttons and photographing buttons. The record-pause button and the photographing button are configured to pause/start recording and take photograph, respectively. The preview window 82 includes the record-pause button 83 and the photographing button 84. The preview window 85 includes the record-pause button 86 and the photographing button 87.

When the main button 81 is clicked, the cell phone starts the two-way recording to start saving the images captured by the first camera in real-time and the sound collected by the microphone in real-time, and the images captured by the second camera in real-time and the sound collected by the microphone in real-time. The preview window 82 is configured to display the first captured images using the first camera. The preview window 85 is configured to display the second captured images using the second camera. When the main button 81 is clicked, the cell phone ends saving the images captured by the first camera in real-time and the sound collected by the microphone in real-time, and the images captured by the second camera in real-time and the sound collected by the microphone in real-time, and generates the corresponding video files simultaneously.

When the cell phone is held horizontally, the processes are similar, which are not repeated.

In embodiments of the present disclosure, the cell phone may obtain the video files recorded horizontally and vertically to improve the user experience.

Embodiments of the present disclosure further provide an image processing device. The modules included in the device may be realized through a processor of the image processing device, or a specific logic circuit. The processor may include a central processing unit (CPU), a micro processing unit (MPU), a digital signal processor (DSP), a field-programmable gate array (FPGA), etc.

Figure 13:
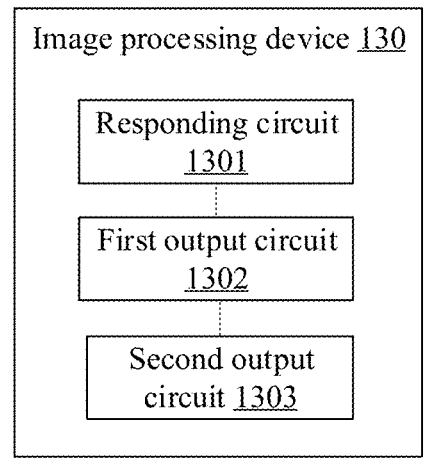
FIG. 13 illustrates a schematic structural diagram of the image processing device according to some embodiments of the present disclosure.

As shown in FIG. 13, the image processing device 130 includes a responding circuit 1301, a first output circuit 1302, and a second output circuit 1303. The responding circuit 1301 is configured to respond to the trigger instruction. The first output circuit 1302 is configured to obtain the first captured images from the first camera in real-time and display the first captured images on the first display area in real-time. The second output circuit 1303 is configured to obtain the second captured images from the second camera in real-time and display the second captured images on the second display area in real-time. The first camera and the second camera are fixed at different positions. The first display area is different from the second display area.

In some embodiments, the long side of the photosensitive array of the first camera is perpendicular to the long side of the photosensitive array of the second camera. The first camera and the second camera are isomorphic camera elements.

In some embodiments, for the same display screen, the first display area is different from the second display area.

In some embodiments, the display processing device 130 also includes a display circuit. The display circuit is configured to display an operating control element on the display screen. The operating control element is at least configured to receive the record-start instruction generated by the first operation of the user to start saving the images captured by the first camera and the second camera in real-time and the sound collected by the microphone in real-time. The operating control element is further configured to receive the record-end instruction generated by the second operation of the user to end saving the images captured by the first camera and the second camera in real-time and the sound collected by the microphone in real-time.

In some embodiments, the image processing device 130 further includes a third output circuit. When the image processing device 130 starts saving the images captured by the first camera and the second camera in real-time and the sound collected by the microphone in real-time based on the record-start instruction, the third output circuit is configured to control the first display area to display the first images captured by the first camera in real-time simultaneously, and the second display area to display the second images captured by the second camera in real-time simultaneously. The first display area includes the first sub-operating control element. The first sub-operating control element is configured to control the first camera. The second display area includes the second sub-operating control element. The second sub-operating control element is configured to control the second camera.

In some embodiments, the image processing device 130 further includes an acquisition circuit, a first control circuit, and a second control circuit. The acquisition circuit is configured to input the operation. The first control circuit is configured to, if the input operation is for the first display area, expand the first display area to the display area of the display screen, display the first sub-operating control element, and close the second camera. The second control circuit is configured to, if the input operation is for the second display area, expand the second display area to the display area of the display screen, display the second sub-operating control element, and close the first camera.

In some embodiments, the image processing device 130 further includes a generation circuit, a bundling circuit, and a saving circuit. The generation circuit is configured to generate the first video file according to the first captured images and generate the second video file according to the second captured images. The bundling circuit is configured to bundle the video file information of the first video file and the video file information of the second video file. The saving circuit is configured to save the first video file and the second video file separately.

In some embodiments, the image processing device 130 further includes a selection circuit. The selection circuit is configured to automatically select the different video files from the first video file and the second video file according to the different scenes.

When the image processing device provided by above-described embodiments processes the image, the division of the above-described program modules is taken as an example for description. In practical applications, the above-mentioned processing may be allocated and completed by different program modules according to needs, that is, the internal structure of the device is divided into different program modules to complete all or part of the processing described above. In addition, the image processing device and the image processing method embodiments provided in above embodiments belong to the same concept. For the specific implementation process, reference is made to method embodiments, which are not repeated here.

Figure 14:
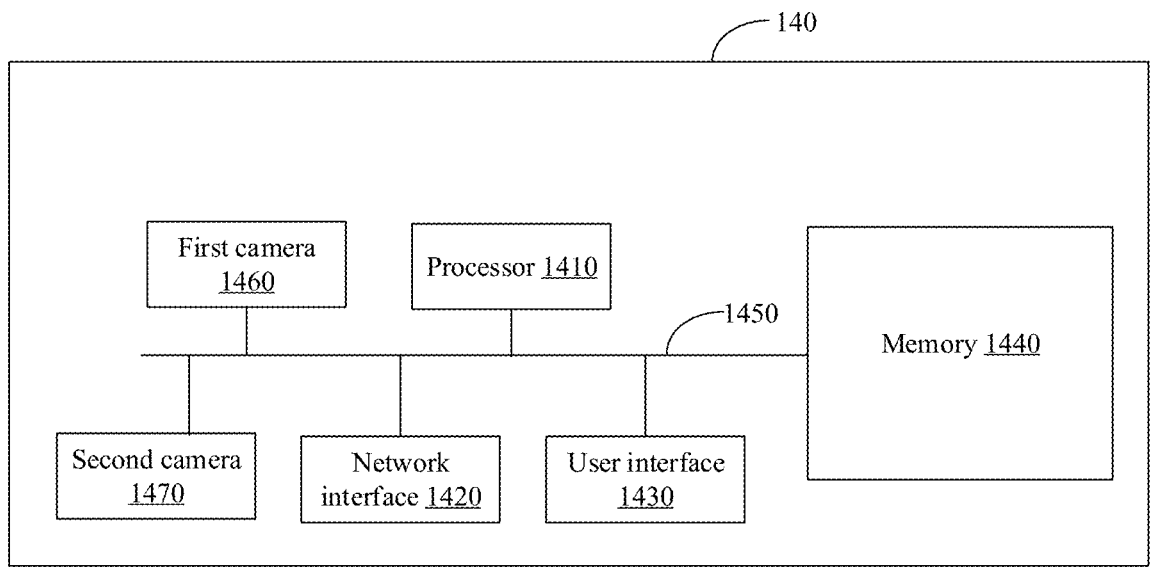
FIG. 14 illustrates a schematic hardware structural diagram of an image processing apparatus according to some embodiments of the present disclosure.

As shown in FIG. 14, the image processing apparatus 140 includes at least one processor 1410, a memory 1440, at least one network interface 1420, a user interface 1430, a first camera 1460, and a second camera 1470. The components of the image processing apparatus 140 are coupled through a bus system 1450. The bus system 1450 is configured to realize the communicative connection among these components. The bus system 1450 includes a power source bus, a control bus, and a status bus in addition to a data bus. For clarity, various types of buses in FIG. 14 all refer to the bus system 1450.

The user interface 1430 may include a monitor, a keyboard, a mouse, a trackball, a click wheel, keys, buttons, a touchpad, a touch screen, etc.

The memory 1440 may include volatile memory or non-volatile memory, and may also include both volatile and non-volatile memory. The non-volatile memory may include read-only memory (ROM). The volatile memory may include random access memory (RAM). The memory 1440 described in the present invention is intended to include any suitable type of memory.

The memory 1440 in the present invention may store data to support the operation of the image processing apparatus 140. For example, the data includes any computer program for operating on the image processing apparatus 140, such as an operating system and an application program. Among them, the operating system contains various system programs, such as a framework layer, a core library layer, a driver layer, etc., for implementing various basic services and processing hardware-based tasks. The application program may include various application programs.

The processor 1410 is used to respond to the trigger instruction, obtain the first captured images in real-time from the first camera, and display the first captured images in real-time on the first display area, obtain the second captured images in real-time from the second camera, and display the second captured images on the second display area in real-time. The first camera and the second camera have different are fixed at the positions. The first display area is different from the second display area. The processor 1410 is configured to implement the processes in the image processing method provided in above-described embodiments when the computer program is executed.

For example, the method provided by embodiments of the present disclosure may be directly embodied as a combination of software modules executed by the processor 1410. For example, the image processing device provided by embodiments of the present disclosure. The software module of the processing device may be stored in the memory 1440. The processor 1410 reads the executable instructions included in the software module in the memory 1440, and combines the necessary hardware (e.g., including the processor 1410 and other components connected to the bus 1450) to complete the image processing method.

As an example, the processor 1410 may be an integrated circuit chip with signal processing capabilities, such as a general-purpose processor, a digital signal processor (DSP), or other programmable logic devices, discrete gates, or transistor logic devices, discrete hardware components, etc. The general-purpose processor may be a microprocessor or any conventional processor.

Figure 16:
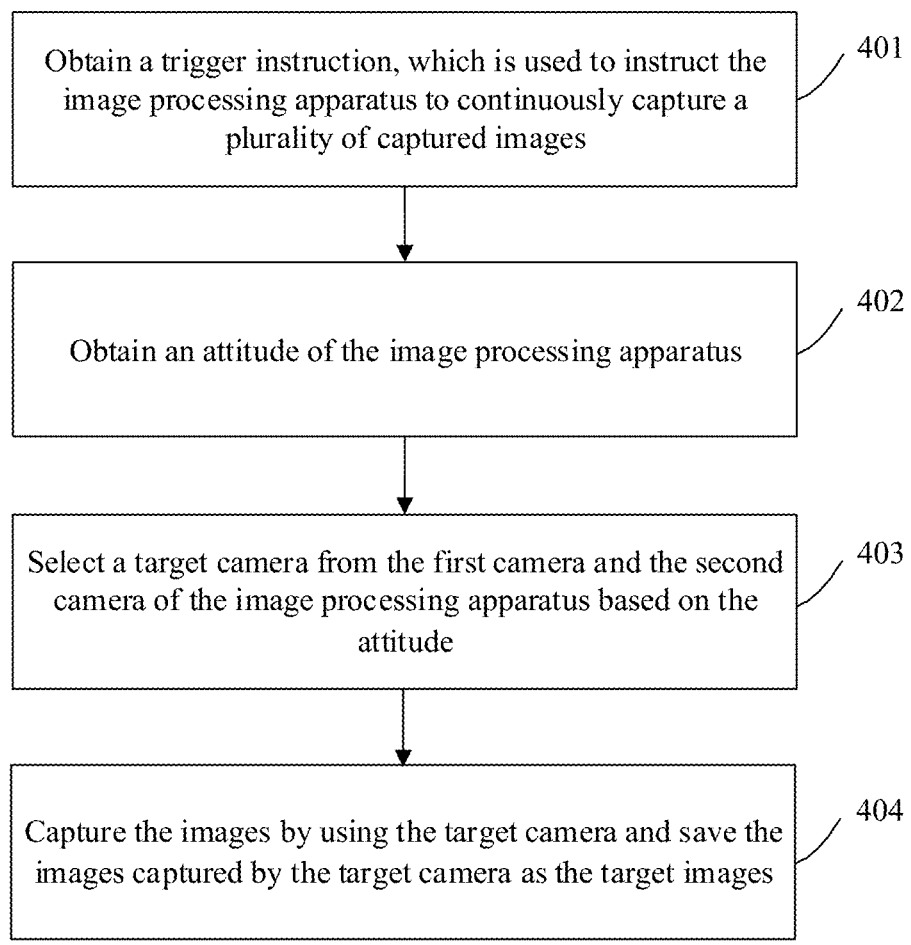
FIG. 16 illustrates another schematic flowchart of an image processing method according to some embodiments of the present disclosure.

In some other embodiments, another image processing method is provided, which may be applied to an image processing apparatus. As shown in FIG. 16, the image processing method includes the following processes.

At 401, the method includes obtaining a trigger instruction, which is used to instruct the image processing apparatus to continuously capture a plurality of captured images.

In some embodiments, when receiving the trigger operation input by the user, the image processing apparatus generates the trigger instruction based on the trigger operation.

For example, the image processing apparatus opens a camera application. When receiving the trigger operation input by the user to instruct the image processing apparatus to continuously capture the plurality of captured images, the image processing apparatus generates the trigger instruction.

At 402, the method includes obtaining an attitude of the image processing apparatus.

The attitude at least includes a horizontal-oriented attitude and a vertical-oriented attitude.

In some embodiments, the image processing apparatus obtains a first parameter detected by its gravity sensor. The image processing apparatus determines whether the attitude of the image processing apparatus is currently horizontal or vertical based on the first parameter.

For example, the first parameter may include a voltage value. In some embodiments, the gravity sensor calculates a horizontal direction through the voltage values generated in two orthogonal directions to determine whether the image processing apparatus is currently held horizontally or vertically.

At 403, the method includes selecting a target camera from the first camera and the second camera of the image processing apparatus based on the attitude.

As such, the image processing apparatus selects the target camera from the first camera and the second camera based on the image processing apparatus, such that the image captured by the target camera is suitable to the attitude of the image processing apparatus.

At 404, the method includes capturing the images by using the target camera and saving the images captured by the target camera as the target images.

As such, the images captured by the target camera may be used as a part of data of a target file.

The method may further include closing a non-target camera of the first camera and the second camera, when the image processing apparatus captures the images by using the target camera. In another embodiment, the method may further include omitting the images captured by the non-target camera of the first camera and the second camera, when the image processing apparatus captures the images by using the target camera.

As such, the image captured by the non-target camera may not be saved as the target image and not used as part of the data of the target file.

By using the image processing method of the present disclosure, the image processing apparatus obtains the trigger instruction configured to instruct the image processing apparatus to continuously capture the plurality of images, obtains the attitude of the image processing apparatus, selects the target camera from the first camera and the second camera based on the attitude, captures the images by using the target camera, and saves the images captured by the target camera as the target images. As such, the image processing apparatus selects the target camera in connection with the current attitude of the image processing apparatus and saves the images captured by the target camera, such that the image captured by the target camera may be used as the part of data of the target file. Therefore, when the image processing apparatus plays the target file, the displayed target image is suitable with the attitude during image capturing.

Figure 17:
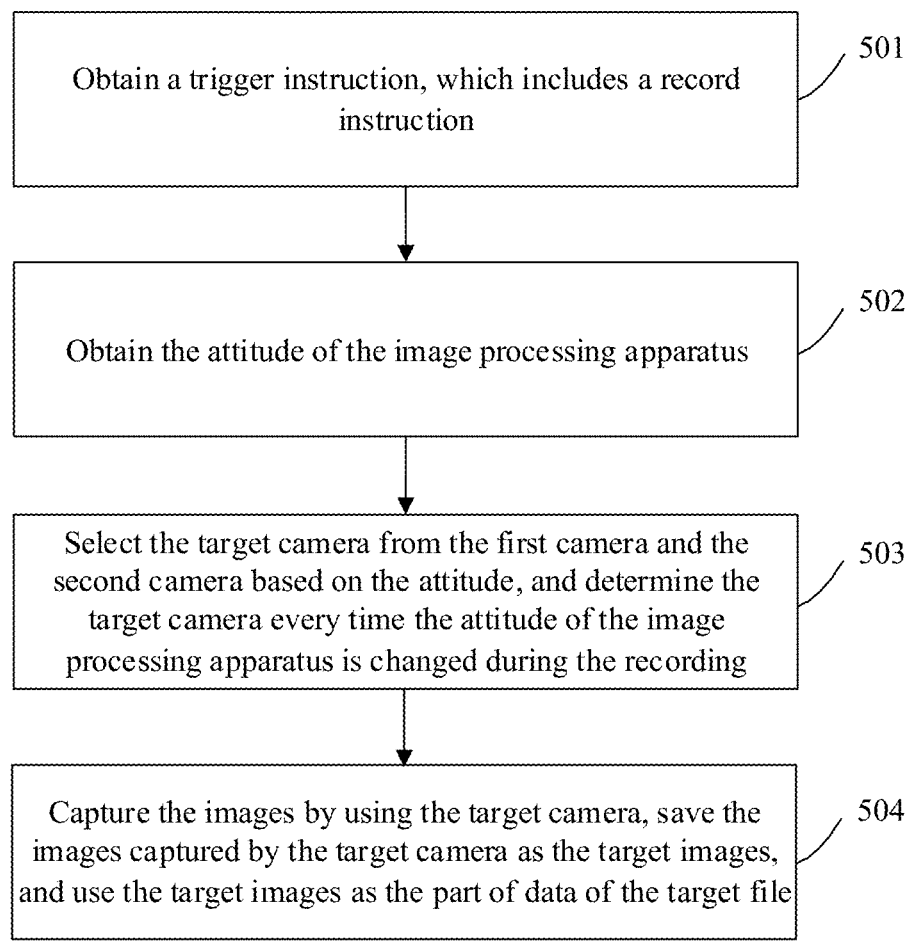
FIG. 17 illustrates another schematic flowchart of an image processing method according to some embodiments of the present disclosure.

In some embodiments, another image processing method is provided, which may be applied to the image processing apparatus. As shown in FIG. 17, the image processing method includes the following processes.

At 501, the method includes obtaining a trigger instruction, which includes a record instruction.

At 502, the method includes obtaining the attitude of the image processing apparatus.

The attitude at least includes a horizontal-oriented direction and the vertical-oriented direction.

At 503, the method includes selecting the target camera from the first camera and the second camera based on the attitude, and determining the target camera every time the attitude of the image processing apparatus is changed during the recording.

As such, the image processing apparatus may adjust the target camera in time based on the attitude of the image processing apparatus, such that the image captured by the target camera is suitable to the attitude of the image processing apparatus.

At 504, the method includes capturing the images by using the target camera, saving the images captured by the target camera as the target images, and using the target images as the part of data of the target file.

As such, the target images captured by the target camera may be used as the image data of the video file.

In some embodiments, when obtaining the trigger instruction indicating record-start, the image processing apparatus selects the target camera based on the attitude of the image processing apparatus at this moment. That is, the target camera which is suitable to the attitude is automatically selected for the user when the image processing apparatus obtains the trigger instruction. During recording, the image processing apparatus determines the target camera every time the image processing apparatus detects that the user changes the attitude of the image processing apparatus. As such, the image processing apparatus records the target file, which is consistent with the display preview effect shown at the time that the image processing apparatus obtains the trigger instruction.

In some embodiments, the method further includes obtaining the first operation before recording, determining the target record mode based on the first operation, and selecting the target camera from the first camera and the second camera according to the target record mode. The first operation is used for the user to indicate a target record mode. The target record mode may be selected from a landscape mode and a portrait mode.

The target record mode may be considered as indicating the display effect of the target image when the image processing apparatus plays the target file.

As such, before recording, the image processing apparatus may determine the target camera according to the record mode indicated by the user. Thus, the recorded image is consistent with the record mode indicated by the user.

In some embodiments, before the first operation, the method includes, when the image processing apparatus enters the video preview interface, calling the default camera to preview and prompting the record button corresponding to the current preview effect, and when the image processing apparatus receives the operation of switching the record button, calling the non-default camera to preview. The current preview effect is adapted to the current attitude of the image processing apparatus.

In some embodiments, the current preview effect being suitable to the current attitude of the image processing apparatus means that: the preview interface corresponding to the vertical-oriented direction includes the vertical-oriented-image interface, and/or the preview interface corresponding to the horizontal-oriented direction includes the horizontal-oriented-image interface.

In some embodiments, when the indicated record mode is the landscape mode, selecting the target camera from the first camera and the second camera based on the attitude includes at least one of: selecting the first camera as the target camera when the attitude is horizontal, selecting the second camera as the target camera when the attitude is vertical, selecting the second camera as the target camera when the attitude rotates from horizontal to vertical, or selecting the first camera as the target camera when the attitude rotates from vertical to horizontal. The first camera captures horizontal images when the attitude of the image processing apparatus is horizontal and vertical images when the attitude of the image processing apparatus is vertical. The second camera captures the horizontal images when the attitude of the image processing apparatus is vertical and the vertical images when the attitude of the image processing apparatus is horizontal.

As such, the image processing apparatus may switch the target camera in time to cause the image of the video file recorded by the image processing apparatus to be suitable to the indicated landscape mode.

In some embodiments, when the indicated record mode is the portrait mode, selecting the target camera from the first camera and the second camera based on the attitude include selecting the second camera as the target camera when the attitude is horizontal, selecting the first camera as the target camera when the attitude is vertical, selecting the first camera as the target camera when the attitude rotates from horizontal to vertical, and selecting the second camera as the target camera when the attitude rotates from vertical to horizontal. The second camera captures the horizontal images when the attitude of the image processing apparatus is vertical and the vertical images when the attitude of the image processing apparatus is horizontal. The first camera captures the horizontal images when the attitude of the image processing apparatus is horizontal and the vertical images when the attitude of the image processing apparatus is vertical.

As such, the image processing apparatus may switch the target camera in time to cause the image of the video file recorded by the image processing apparatus to be suitable to the indicated portrait mode.

The image processing method of embodiments of the present disclosure further includes obtaining the trigger instruction configured to instruct to record, obtaining the attitude of the image processing apparatus, selecting the target camera from the first camera and the second camera of the image processing apparatus based on the attitude, determining the target camera every time the attitude of the image processing apparatus changes during recording, capturing the image using the target camera, saving the image captured by the target camera as the target image, and using the target image as the part of data as the target file. As such, the image processing apparatus selects the target camera in connection with the current attitude of the image processing apparatus, and saves the image captured by the target camera. Thus, the image captured by the target camera is used as the part of data of the target file, such that the displayed target image is suitable to the attitude during image capturing when the image processing apparatus plays the target file.

FIGS. 18A and 18B illustrate schematic diagrams of an image processing apparatus performing horizontal recording and vertical recording when being held vertically according to some embodiments of the present disclosure. FIG. 18A shows the vertical recording by selecting the first camera. FIG. 18B shows the horizontal recording by selecting the second camera.

For example, when the image processing apparatus is held vertically, the user may start the first camera (camera A) for the vertical recording, and at the same time, the image processing apparatus prompts an option to allow the user to start the second camera (camera B) for the horizontal-recording. In some embodiments, the image processing apparatus enters the record preview interface when being held vertically. A viewfinder frame calls camera A to preview by default. At this time, the user may click the left button to start the vertical recording. If the user wants to perform the horizontal recording, the user may click the right button to activate camera B for the horizontal recording.

The above-described interaction is merely illustrative, which may be set or adjusted according to the user needs or design needs.

FIG. 19 illustrates a schematic diagram of the image processing apparatus performing horizontal recording when being held horizontally according to some embodiments of the present disclosure. The user starts the first camera (camera A) for horizontal recording when the image processing apparatus is held horizontally. FIGS. 20A and 20B illustrate schematic diagrams of the image processing apparatus performing the horizontal recording when rotating from a vertical attitude to a horizontal attitude according to some embodiments of the present disclosure. After the image processing apparatus starts the horizontal recording when being held horizontally, the image processing apparatus may be adjusted to the vertical-oriented direction for the image processing apparatus being held conveniently. FIG. 20A shows the schematic diagram of rotating the image processing apparatus from the horizontal-oriented direction to the vertical-oriented direction, and the recording automatically switches from the camera A to the camera B uninterrupted. FIG. 20B shows the schematic diagram of rotating the image processing apparatus to the vertical-oriented direction for the horizontal recording, the camera B takes over the recording, and the camera A stops recording.

For example, when the image processing apparatus being held horizontally, camera A is used for the horizontal recording. After the recording starts, when the image processing apparatus is rotated to the vertical-oriented direction, camera B automatically takes over the recording. As such, while the user fatigue is reduced, the recording experience is not decreased. By analogy, when the user rotates the image processing apparatus from the vertical-oriented direction to the horizontal-oriented direction, the camera A takes over the recording again. As such, horizontal recording unrelated to the attitude of the image processing apparatus can be achieved.

The technical solution provided by embodiments may solve the problem that the vertically recorded video cannot be displayed in full screen when the video is played in the apparatus arranged horizontally, which affects the viewing effect significantly. The technical solution provided by embodiments may realize the horizontal recording in the vertical-oriented direction, such that the horizontal recording can be realized by using one hand. As such, the problems alleviated by the disclosed method includes: both hands being occupied to hold the image processing apparatus horizontally to realize the horizontal recording, hand palms easily blocking the viewfinder frame, arm fatigue due to long time recording, etc.

Figure 21:
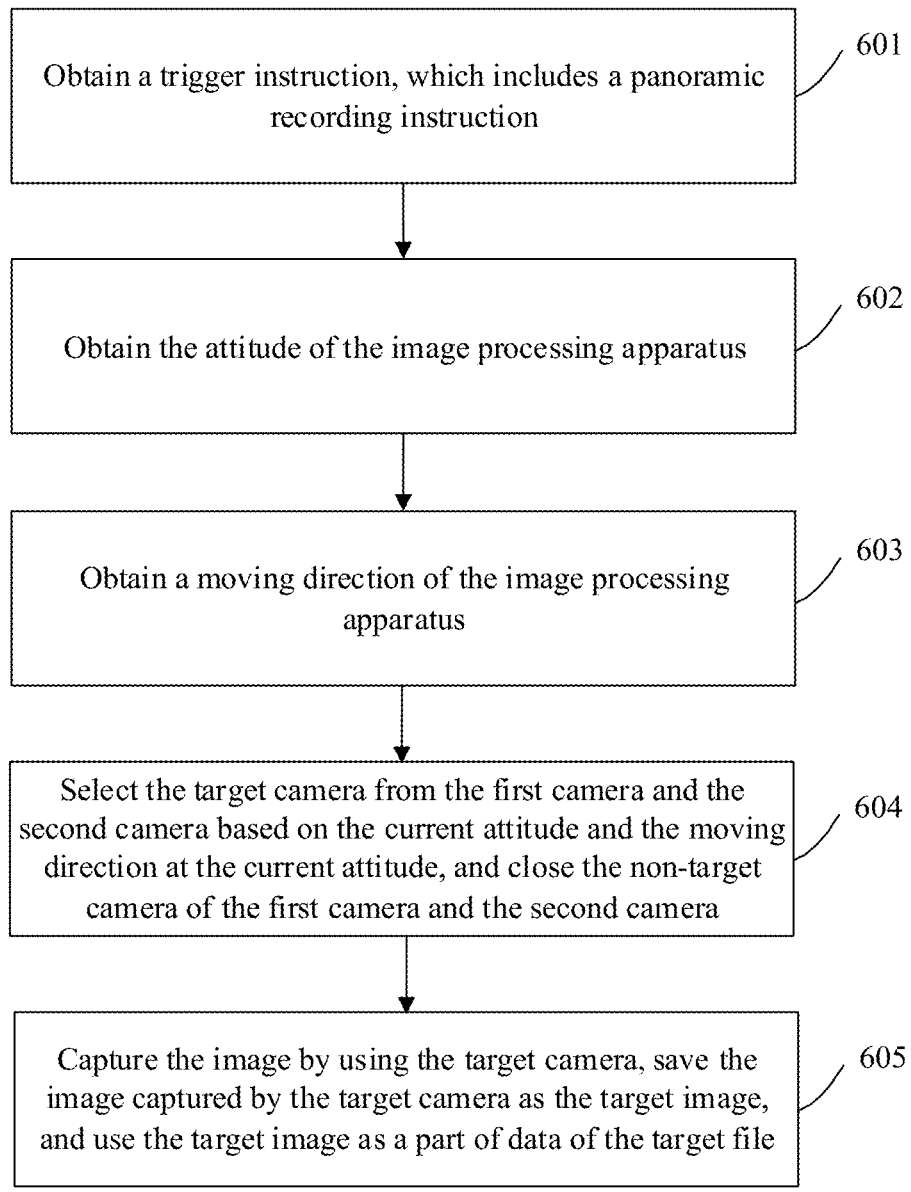
FIG. 21 illustrates another schematic flowchart of an image processing method according to some embodiments of the present disclosure.

In some embodiments, an image processing method is provided and is applied to the image processing apparatus. As shown in FIG. 21, the method includes the following processes.

At 601, the method includes obtaining a trigger instruction, which includes a panoramic recording instruction.

At 602, the method includes obtaining the attitude of the image processing apparatus.

The attitude at least includes the horizontal-oriented direction and the vertical-oriented direction.

At 603, the method includes obtaining a moving direction of the image processing apparatus.

At 604, the method includes selecting the target camera from the first camera and the second camera based on the current attitude and the moving direction at the current attitude, and closing the non-target camera of the first camera and the second camera.

As such, the image processing apparatus selects the target camera from the first camera and the second camera based on the attitude of the image processing apparatus and the moving direction at the current attitude. Therefore, the image captured by the target camera is suitable to the attitude of the image processing apparatus and the moving direction at the current attitude.

At 605, the method includes capturing the image by using the target camera, saving the image captured by the target camera as the target image, and using the target image as a part of data of the target file.

In some embodiments, when obtaining the trigger instruction indicating the panoramic recording, the image processing apparatus selects the target camera based on the current attitude of the image processing apparatus. During recording, the image processing apparatus obtains the moving direction of the image processing apparatus or the recording moving direction, selects the target camera in connection with the moving direction of the image processing apparatus or the recording moving direction based on the attitude of the image processing apparatus when obtaining the trigger instruction.

Figure 15:
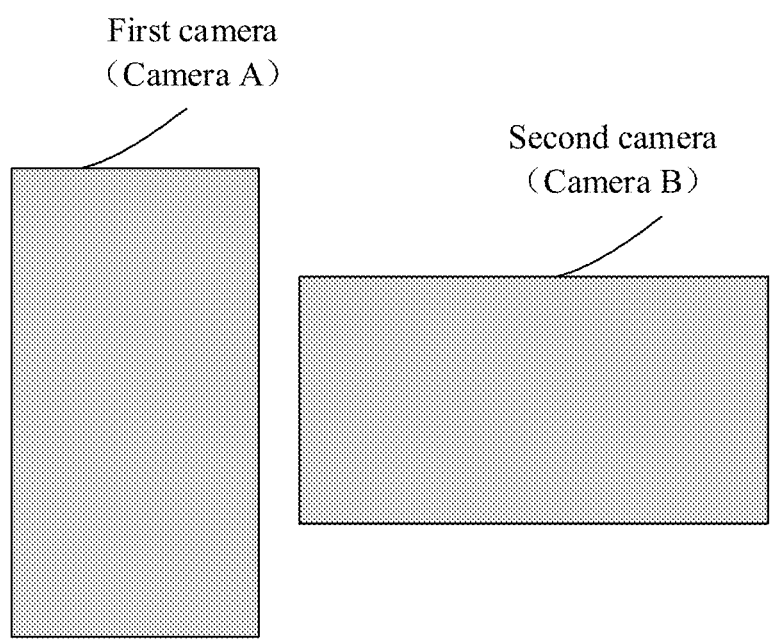
FIG. 15 illustrates a schematic diagram of a layout of a first camera and a second camera of an image processing apparatus according to some embodiments of the present disclosure.

FIG. 15 shows the hardware layout of the image processing apparatus. when the user performs the panoramic recording, the image processing apparatus may realize four-way wide-frame recording according to rule combinations shown in Table 1.

TABLE 1

| Attitude | Recording moving direction | | | |
|---|---|---|---|---|
| | Up | Down | Left | Right |
| Vertical | Use camera B | Use camera B | Use camera A | Use camera A |
| Horizontal | Use camera A | Use camera A | Use camera B | Use camera B |

For example, when the image processing apparatus is held vertically, after the image processing apparatus enters the panoramic recording mode, the viewfinder frame uses the preview data of the camera A by default. In the vertical-oriented direction, during recording, when the recording moving direction or the moving direction of the image processing apparatus changes, the image processing apparatus selects the target camera according to the current recording moving direction or the moving direction of the image processing apparatus. In some embodiments, when the moving direction is to the left or the right, the image processing apparatus still selects the camera A as the target camera, and the camera B is still off. When the moving direction is up or down, the image processing apparatus selects the camera B as the target camera, uses the camera for recording, and closes the camera A.

Figure 22:
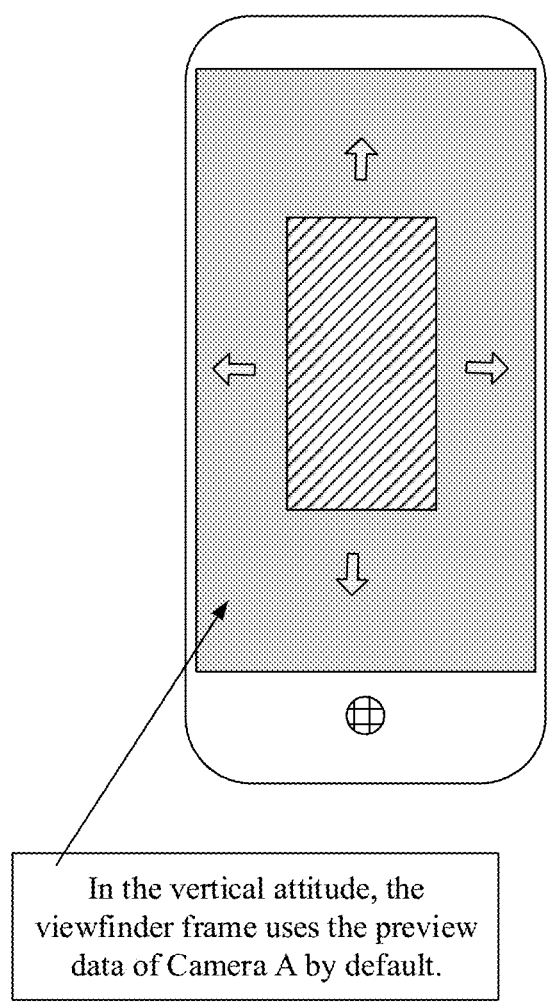
FIG. 22 illustrates a schematic diagram of the image processing apparatus enters a full-screen recording mode when being held vertically according to some embodiments of the present disclosure.

FIG. 22 illustrates a schematic flowchart of the image processing apparatus enters a full-screen recording mode when being held vertically according to some embodiments of the present disclosure. As shown in FIG. 8, when the image processing apparatus is held vertically, the viewfinder frame uses the preview data of the camera A by default, which supports the image processing apparatus to move left, right, up, and down in the vertical-oriented direction.

For example, when the image processing apparatus is held horizontally, after the image processing apparatus enters the panoramic recording mode, the viewfinder frame uses the preview data of the camera B by default. In the horizontal-oriented direction, during recording, when the recording moving direction or the moving direction of the image processing apparatus changes, the image processing apparatus selects the target camera according to the recording moving direction or the moving direction of the image processing apparatus. In some embodiments, when the moving direction is to the left or the right, the image processing apparatus still selects the camera B as the target camera, and the camera A is still off. When the moving direction is up or down, the image processing apparatus selects the camera A as the target camera, uses the camera A for recording, and closes the camera B.

Figure 23:
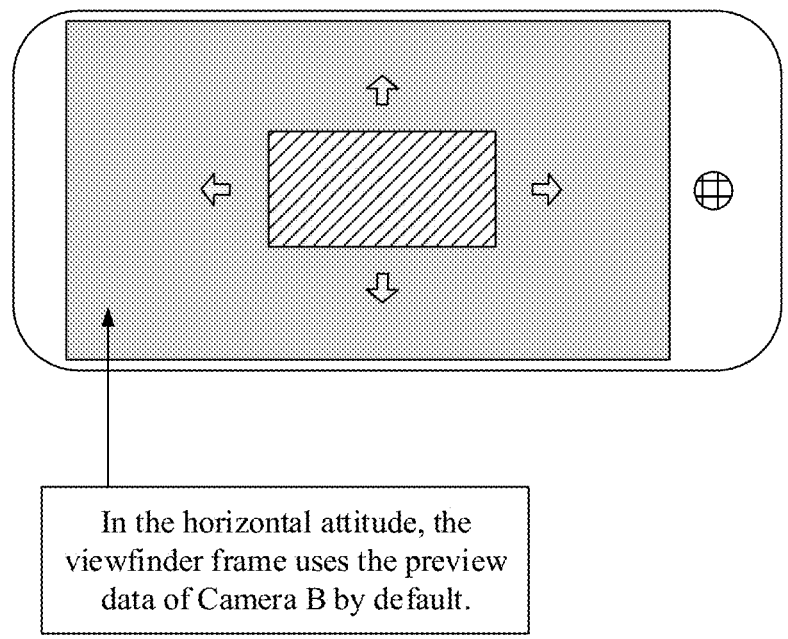
FIG. 23 illustrates a schematic diagram of the image processing apparatus enters the full-screen recording mode when being held horizontally according to some embodiments of the present disclosure.
Figure 24:
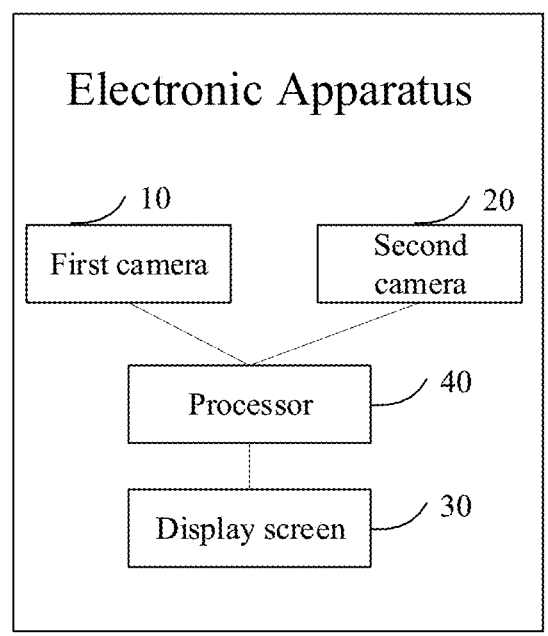
FIG. 24 illustrates a schematic structural diagram of an electronic apparatus according to some embodiments of the present disclosure.

FIG. 23 illustrates a schematic flowchart of the image processing apparatus enters the full-screen recording mode when being held horizontally according to some embodiments of the present disclosure. As shown in FIG. 23, when the image processing apparatus is held horizontally, the viewfinder frame uses the preview data of the camera B by default, which supports the image processing apparatus to move left, right, up, and down in the horizontal-oriented direction.

In related technology, as the wide-screen cell phone is widely used, for a better viewing effect, many manufacturers tend to use a preview frame with a high length-width ratio to fit the full screen. However, the higher the length-width ratio of the preview frame is, the more the loss of the picture is when the image processing apparatus performs the panoramic recording in the narrow-frame direction.

The technical solution described by embodiments may ensure four-way wide-frame recording with the preview frame at any length-width ratio.

Compared to the narrow-frame recording, the wide-frame recording may obtain more scene information. For example, when the length-width ration of the preview frame is 4:3, 33.3% frame may be increased, when the length-width ration of the preview frame is 16:9, 77.7% frame may be increased, and when the length-width ration of the preview frame is 21:9, 133% frame may be increased.

By using the image processing method provided by embodiments of the present disclosure, the image processing apparatus obtains the trigger instruction indicating the panoramic recording, obtains the attitude of the image processing apparatus, obtains the moving direction of the image processing apparatus, selects the target camera from the first camera and the second camera based on the current attitude and the moving direction at the current attitude, closes the non-target camera of the first camera and the second camera, uses the target camera to capture the image, saves the image captured by the target camera as the target image, and uses the target image as a part of data of the target file. As such the image processing apparatus may support the four-way wide-frame panoramic recording at direction of up, down, left, and right.

As shown in FIG. 25, an electronic apparatus may be referred as an image processing apparatus. In some embodiments, an image processing apparatus is provided. The image processing apparatus includes a first camera 10, a second camera 20, a display screen 30, and a processor 40. The display screen 30 is configured to display images. The processor 40 is configured to obtain the trigger instruction, obtain the attitude of the image processing apparatus, select the target camera from the first camera and the second camera based on the attitude, use the target camera to capture the image, and save the image captured by the target camera as the target image. The trigger instruction is used to instruct the image processing apparatus to continuously capture a plurality of captured images.

In some embodiments, the processor 40 is further configured to close the non-target camera of the first camera and the second camera while using the target camera to capture the image, or omit the captured image captured by the non-target camera of the first camera and the second camera.

In the above-described technical solution, the first camera and the second camera have the same components and the same optical parameters. In the image processing apparatus, the long side of the photosensitive array of the first camera is perpendicular to the long side of the photosensitive array of the second camera. The long side of the photosensitive array of the first camera corresponds to the long side of the image processing apparatus. The long side of the photosensitive array of the second camera corresponds to the short side of the image processing apparatus.

In some embodiments, when the trigger instruction includes the record instruction, the processor 40 is further configured to determine the target camera every time the attitude of the image processing apparatus changes during recording.

In some embodiments, the processor 40 is further configured to obtain the first operation before the recording starts, determine the target record mode based on the first operation, and select the target camera from the first camera and the second camera according to the target record mode. The first operation is used for the user to indicate the record mode. The target record mode includes the landscape mode and the portrait mode.

In some embodiments, when the indicated record mode is the landscape mode, the processor 40 is further configured to select the first camera as the target camera when the attitude is horizontal, and select the second camera as the target camera when the attitude is vertical. The first camera may capture the horizontal images when the attitude of the image processing apparatus is horizontal and the vertical images when the attitude of the image processing apparatus is vertical. The second camera may capture the horizontal images when the attitude of the image processing apparatus is vertical, and the vertical images when the attitude of the image processing apparatus is horizontal.

In some embodiments, when the indicated record mode is the portrait mode, the processor 40 is further configured to select the second camera as the target camera when the attitude is horizontal and select the first camera as the target camera when the attitude is vertical. The second camera may capture the horizontal images when the attitude of the image processing apparatus is vertical and the vertical images when the attitude of the image processing apparatus is horizontal. The first camera may capture the horizontal images when the attitude of the image processing apparatus is horizontal and the vertical images when the attitude of the image processing apparatus is vertical.

In some embodiments, when the trigger instruction is the panoramic recording instruction, the processor 40 is further configured to obtain the moving direction of the image processing apparatus, select the target camera from the first camera and the second camera based on the current attitude and the moving direction at the current attitude, and close the non-target camera of the first camera and the second camera.

The image processing apparatus described by embodiments may select the target camera in connection with the attitude of the image processing apparatus, and use the target camera to capture the image to realize the horizontal-oriented image recording or the vertical-oriented image recording unrelated to the horizontal-oriented direction or the vertical-oriented direction of the image processing apparatus. The image processing apparatus may further solve the problem that the vertically recorded video cannot be displayed in full screen when the video is played in the horizontal apparatus, which affects the viewing effect significantly in the related technology. As such, the image processing apparatus realizes the horizontal recording unrelated to the attitude of the image processing apparatus and supports the four-way wide-frame panoramic recording in up, down, left, and right directions.

In some embodiments, an image processing device is provided and is applied in the image processing apparatus. The image processing device includes a first obtaining unit, a second obtaining unit, a determination unit, and a control unit. The first obtaining unit is configured to obtain the trigger instruction. The trigger instruction is used to instruct the image processing apparatus to continuously capture the plurality of captured images. The second obtaining unit is configured to obtain the attitude of the image processing apparatus. The determination unit is configured to select the target camera from the first camera and the second camera based on the attitude. The control unit is configured to use the target camera to capture the image and save the image captured by the target camera as the target image.

In some embodiments, the control unit is further configured to close the non-target camera of the first camera and the second camera while using the target camera to capture the image, or omit the captured image captured by the non-target camera of the first camera and the second camera.

In some embodiments, when the trigger instruction is the recording instruction, the determination unit is further configured to determine the target camera every time the attitude of the image processing apparatus changes during recording.

In some embodiments, the first obtaining unit is further configured to obtain the first operation before the recording starts, and when the trigger instruction is the recording instruction. The first operation is used for the user to indicate the record mode. the determination unit is further configured to determine the target record mode based on the first operation, and select the target camera from the first camera and the second camera according to the target record mode. The target record mode includes the landscape mode and the portrait mode.

In some embodiments, when the indicated record mode is the landscape mode, the determination unit is further configured to select the first camera as the target camera when the attitude is horizontal, and select the second camera as the target camera when the attitude is vertical. The first camera captures the horizontal images when the attitude of the image processing apparatus is horizontal and the vertical images when the attitude of the image processing apparatus is vertical. The second camera capture the horizontal images when the attitude of the image processing apparatus is vertical and the vertical images when the attitude of the image processing apparatus is horizontal.

In some embodiments, when the indicated record mode is the portrait mode, the determination unit is further configured to select the second camera as the target camera when the attitude is horizontal, and select the first camera as the target camera when the attitude is vertical. The second camera captures the horizontal images when the attitude the image processing apparatus is vertical and the vertical images when the attitude of the image processing apparatus is horizontal. The first camera captures the horizontal images when the attitude of the image processing apparatus is horizontal and the vertical images when the attitude of the image processing apparatus is vertical.

In some embodiments, the trigger instruction is the panoramic recording instruction, and the second obtaining unit is further configured to obtain the moving direction of the image processing apparatus. The determination unit is further configured to select the target camera from the first camera and the second camera based on the current attitude and the moving direction at the current attitude, and close the non-target camera of the first camera and the second camera.

Those of skill in the art should understand that, in some embodiments, for the implementation functions of the processing modules of the image processing device, reference may be made to the description of the image processing method of above-described embodiments.

Those of skill in the art should understand that, in some optional embodiments, the functions of each of the processing units in the image processing device may be implemented by a program running on a processor, or may be implemented by a specific logic circuit.

In practical applications, the specific structures of the first obtaining unit, the second obtaining unit, the determination unit, and the control unit described above may all correspond to the processor. The specific structure of the processor may be a central processing unit (CPU), a microcontroller unit (MCU), a digital signal processor (DSP), or a programmable logic device (PLC), and other electronic components or collections of electronic components with processing functions. The processor includes executable code, and the executable code is stored in a storage medium. The processor may be connected to the storage medium through a communication interface such as a bus. When executing specific functions corresponding to each of the units, the processor reads and runs the executable code from the storage medium. The part of the storage medium for storing the executable code is a non-transitory storage medium.

The image processing device provided by embodiments of the present disclosure can select the target camera in connection with the attitude of the image processing apparatus, and use the target camera to capture the image to realize the horizontal-oriented image recording or vertical-oriented image recording irrespective of the horizontal-oriented or vertical-oriented direction of the image processing apparatus, and solve the problem that the vertically recorded video cannot be displayed in full screen when the video is played in the horizontal-oriented device, which affects the viewing effect significantly in the related technology to realize the horizontal recording regardless of the attitude of the image processing apparatus and support four-way wide-frame panoramic recording in up, down, left, and right directions.

In some embodiments, the computer storage medium is provided and stores the computer-executable instructions. The executable instructions are executed by the processor to obtain the trigger instruction, obtain the attitude of the image processing apparatus, select the target camera from the first camera and the second camera of the image processing apparatus based on the attitude, use the target camera to capture the image, and store the image captured by the target camera as the target image. The trigger instruction is used to instruct the image processing apparatus to continuously capture the plurality of captured images.

Those skilled in the art should understand that the function of each program in the computer storage medium of embodiments can be understood by referring to the related description of the image processing method described in above embodiments, which are not repeated here.

In some embodiments provided in the present disclosure, the disclosed server and method may be implemented in other ways. Device embodiments described above are only schematic. The term "device" used in claims may include any device such as an image processing apparatus, an image processing device, etc. For example, the division of the units is only a logical function division, and in actual implementation, another division method may exist. For example, multiple units or components may be combined, or can be integrated into another system, or some features can be ignored, or not implemented. In addition, the coupling or direct coupling or communication connection between the displayed or discussed components may be through some interfaces, and the indirect coupling or communication connection of the device or unit may be electrical, mechanical, or other forms.

The units described as separate components may or may not be physically separated, and the components displayed as units may or may not be physical units. That is, they may be located in one place or distributed to multiple network units. Some or all of the units may be selected according to actual needs to achieve the purpose of the solution of this embodiment.

In addition, the functional units in embodiments of the present disclosure may all be integrated into one processing unit, or each unit may be separately used as a unit, or two or more units may be integrated into one unit. The above-integrated unit can be implemented in the form of hardware, or in the form of hardware plus software functional units.

Those of ordinary skill in the art should understand that all or part of the processes for implementing the above method embodiments may be completed by program instructions related hardware. The above-described program may be stored in a computer-readable storage medium, and when the program is executed, the processes of the above method embodiments are executed. The above-described storage medium includes mobile storage devices, read-only memory (ROM), random access memory (RAM), magnetic disks or optical disks, etc. A medium that can store program codes.

If the above-integrated unit of the present disclosure is implemented in the form of a software function module and sold or used as an independent product, the software module may also be stored in a computer-readable storage medium. Based on such an understanding, the technical solutions of embodiments of the present disclosure can be embodied in the form of software products in essence or part of contributions to the existing technology. The computer software products are stored in a storage medium and include several instructions for a computer device (e.g., a personal computer, server, or network device, etc.) to execute all or part of the methods described in embodiments of the present disclosure. The above-described storage media includes various media that can store program codes, such as mobile storage devices, ROM, RAM, magnetic disks, optical disks, etc.

The above description of image processing device embodiments is similar to the above method description, and has the same beneficial effects as the method embodiment, which is not repeated. For technical details that are not disclosed in the image processing device embodiments of the present disclosure, those skilled in the art should refer to the description of the method embodiments of the present disclosure.

Embodiments of the present application further provide a storage medium, which may be a computer-readable storage medium, for example, including a memory storing a computer program. The computer program may be processed by a processor to complete the processes of the above-described method. The computer-readable storage medium may include a memory such as FRAM, ROM, PROM, EPROM, EEPROM, Flash Memory, magnetic surface memory, optical disk, CD-ROM, etc.

Embodiments of the present application also provide a computer-readable storage medium, on which a computer program is stored. When the computer program is processed by a processor, the processes in the image processing method provided in the above embodiments are implemented.

The method disclosed in above embodiments of the present disclosure may be applied to the processor, or implemented by the processor. The processor may be an integrated circuit chip with signal processing capabilities. In the implementation process, each process of the above method may be completed by an integrated logic circuit of hardware in the processor or instructions in the form of software. The above-described processor may be a general-purpose processor, a DSP, or other programmable logic devices, discrete gates or transistor logic devices, discrete hardware components, etc. The processor may implement or execute the methods, processes, and logical block diagrams disclosed in embodiments of the present disclosure. The general-purpose processor may be a microprocessor or any conventional processor. The processes of the method disclosed in the embodiments of the present application may be directly implemented and completed by a hardware decoding processor, or may be implemented and completed by a combination of hardware and software modules in the decoding processor. The software module may be located in a storage medium, and the storage medium is located in memory. The processor reads information in the memory and completes the processes of the above-described method in combination with its hardware.

In embodiments of the present disclosure, the memory may be a volatile memory or a non-volatile memory, and may also include both volatile and non-volatile memory. Among them, non-volatile memory may include ROM, programmable read-only memory (PROM), erasable programmable read-only memory (EPROM), electrically erasable and removable programmable read-only memory (EEPROM), ferromagnetic random access memory (FRAM), flash memory, magnetic surface memory, compact disc, or compact disc read-only memory (CD-ROM). The magnetic surface memory may include disk memory or tape memory. The volatile memory may be a random-access memory (RAM), which is used as an external cache. By way of example but not limitation, many forms of RAM are available, such as static random access memory (SRAM), synchronous static random access memory (SSRAM), dynamic random access memory (DRAM), synchronous dynamic random access memory (SDRAM), double data rate synchronous dynamic random access memory (DDRSDRAM), enhanced synchronous dynamic random access memory (ESDRAM), SyncLink link dynamic random access memory (SLDRAM), direct rambus random access memory (DRRAM). The memories described in embodiments of the present disclosure are intended to include but are not limited to these and any other suitable types of memories.

Those skilled in the art should understand that other configurations and functions of the image processing method in embodiments of the present disclosure are known to those skilled in the art. To reduce redundancy, embodiments of the present disclosure are not repeated.

In the description of this specification, the terms "one embodiment," "some embodiments," "examples," "specific examples," or "some examples" means specific features and structures described in conjunction with embodiments or examples, materials, or features are included in at least one embodiment or example of the present disclosure. In this specification, the schematic expression of the above terms does not necessarily refer to same embodiments or examples. Moreover, the specific features, structures, materials, or characteristics described may be combined in any suitable manner in any one or more embodiments or examples.

Although embodiments of the present disclosure are shown and described, those of ordinary skill in the art may understand that various changes, modifications, substitutions, and variations may be made to embodiments without departing from the principle and objective of the present disclosure. The scope of the present disclosure is defined by the claims and their equivalents.

What is claimed is:

1. A method, comprising:
in response to a trigger instruction, obtaining first images from a first camera and displaying the first images on a first display area; and
obtaining second images from a second camera and displaying the second images on a second display area;
wherein:
the first camera and the second camera are located at different positions;
the first display area is different from the second display area;
the first camera and the second camera have same components and optical parameters; and
a long side of a photosensitive array of the first camera is perpendicular to a long side of a photosensitive array of the second camera.

2. The method of claim 1, wherein:
the long side of the photosensitive array of the first camera corresponds to a long side of a device; and
the long side of the photosensitive array of the second camera corresponds to a short side of the device.

3. The method of claim 1, wherein the first display area and the second display area are different display areas of a same display screen.

4. The method of claim 3, further comprising:
displaying an operating control element on the display screen;
upon receiving a first user operation on the operating control element, generating a record-start instruction to start saving, in real-time, images captured by the first camera and the second camera in real-time and sound captured by a microphone; and upon receiving a second user operation on the operating control element, generating a record-end instruction to end saving the images captured by the first camera and the second camera and the sound captured by the microphone.

5. The method of claim 4, further comprising: when saving, in real-time, the images captured by the first camera and the second camera and the sound captured by the microphone,
simultaneously displaying the first image captured by the first camera on the first display area and displaying the second images captured by the second camera on the second display area;
wherein:
the first display area includes a first sub-operating control element configured to operate and control the first camera; and
the second display area includes a second sub-operating control element configured to operate and control the second camera.

6. The method of claim 1, further comprising:
obtaining an input operation;
if the input operation is directed to the first display area, expanding the first display area to a display area of a display screen, displaying a first sub-operating control element, and closing the second camera simultaneously; and
if the input operation is directed to the second display area, expanding the second display area to the display area of the display screen, displaying a second sub-operating control element, and closing the first camera simultaneously.

7. The method of claim 1, further comprising:
generating a first video file according to the first captured images and generating a second video file according to the second captured images;
binding video file information of the first video file and video file information of the second video file; and
saving the first video file and the second video file respectively.

8. The method of claim 7, further comprising automatically selecting one video file from the first video file and the second video file according to different scenes.

9. The method of claim 1, further comprising:
obtaining an attitude of a device;
selecting a target camera from the first camera and the second camera of the device based on the attitude; and
using the target camera to capture images and saving the images captured by the target camera as target images.

10. The method of claim 9, further comprising:
closing a non-target camera of the first camera and the second camera while using the target camera to capture the images; or
omitting images captured by the non-target camera of the first camera and the second camera.

11. The method of claim 9, further comprising:
obtaining the attitude of the device upon receiving a recording instruction of continuously capturing a plurality of images, and
during recording, determining the target camera every time the attitude of the device changes.

12. The method of claim 11, further comprising:
obtaining a first operation of identifying a record mode before starting the recording;
determining a target record mode based on the first operation; and selecting the target camera from the first camera and the second camera according to the target record mode, the target record mode including one of a portrait mode and a landscape mode.

13. The method of claim 12, wherein the target record mode is the portrait mode, selecting the target camera from the first camera and the second camera according to the target record mode includes:
   when the attitude is horizontal, selecting the first camera as the target camera, the first camera being configured to capture horizontal images when the attitude of the device is horizontal and vertical images when the attitude of the device is vertical; and
   when the attitude is vertical, selecting the second camera as the target camera, the second camera being configured to capture horizontal images when the attitude of the device is vertical and horizontal images when the attitude of the device is horizontal.

14. The method of claim 12, wherein the indicated record mode is the portrait mode, selecting the target camera from the first camera and the second camera according to the target record mode includes:
   when the attitude is horizontal, selecting the second camera as the target camera, the second camera being configured to capture horizontal images when the attitude of the device is vertical and vertical images when the attitude of the device is horizontal; and
   when the attitude is vertical, selecting the first camera as the target camera, the first camera being configured to capture horizontal images when the attitude of the device is horizontal and vertical images when the attitude of the device is vertical.

15. The method of claim 9, further comprising:
   in response to a panoramic recording instruction, obtaining a moving direction of the device;
   wherein selecting the target camera from the first camera and the second camera based on the attitude includes:
      selecting the target camera from the first camera and the second camera based on the attitude and the moving direction; and
      closing a non-target camera of the first camera and the second camera.

16. A device, comprising:
   a first camera;
   a second camera;
   a processor; and
   a memory, storing instructions that, when executed by the processor, cause the processor to:
      in response to a trigger instruction, obtain first images from a first camera and display the first images on a first display area; and
      obtain second images from a second camera and display the second images on a second display area;
   wherein:
      the first camera and the second camera are located at different positions;
      the first display area is different from the second display area;
      the first camera and the second camera have same components and optical parameters; and
      a long side of a photosensitive array of the first camera is perpendicular to a long side of a photosensitive array of the second camera.

17. The device of claim 16, wherein:
   the long side of the photosensitive array of the first camera corresponds to a long side of the device; and
   the long side of the photosensitive array of the second camera corresponds to a short side of the device.

18. A non-transitory storage medium storing computer programs that, when executed by a processor, cause the processor to:
   in response to a trigger instruction, obtain first images from a first camera and display the first images on a first display area; and
   obtain second images from a second camera and display the second images on a second display area;
   wherein:
      the first camera and the second camera are located at different positions;
      the first display area is different from the second display area;
      the first camera and the second camera have same components and optical parameters; and
      a long side of a photosensitive array of the first camera is perpendicular to a long side of a photosensitive array of the second camera.

* * * * *